United States Patent
Matzakos et al.

(10) Patent No.: US 6,821,501 B2
(45) Date of Patent: Nov. 23, 2004

(54) INTEGRATED FLAMELESS DISTRIBUTED COMBUSTION/STEAM REFORMING MEMBRANE REACTOR FOR HYDROGEN PRODUCTION AND USE THEREOF IN ZERO EMISSIONS HYBRID POWER SYSTEM

(75) Inventors: Andreas Nikolaos Matzakos, Missouri City, TX (US); Scott Lee Wellington, Bellaire, TX (US); Thomas Mikus, Houston, TX (US); John Michael Ward, Katy, TX (US)

(73) Assignee: Shell Oil Company, Houston, TX (US)

( * ) Notice: Subject to any disclaimer, the term of this patent is extended or adjusted under 35 U.S.C. 154(b) by 366 days.

(21) Appl. No.: 10/091,104

(22) Filed: Mar. 5, 2002

(65) Prior Publication Data

US 2003/0068269 A1 Apr. 10, 2003

Related U.S. Application Data

(60) Provisional application No. 60/273,354, filed on Mar. 5, 2001.

(51) Int. Cl.$^7$ ................................................. C01B 3/26
(52) U.S. Cl. ....................................... 423/652; 252/353
(58) Field of Search .......................... 252/373; 423/652, 423/653; 429/12

(56) References Cited

U.S. PATENT DOCUMENTS

| | | | |
|---|---|---|---|
| 4,810,485 A | 3/1989 | Marianowski et al. | 423/648.1 |
| 5,229,102 A | 7/1993 | Minet et al. | 423/652 |
| 5,326,550 A | 7/1994 | Adris et al. | 423/652 |
| 5,525,322 A | 6/1996 | Willms | 423/653 |
| 5,639,431 A * | 6/1997 | Shirasaki et al. | 422/212 |
| 5,741,474 A | 4/1998 | Isomura et al. | 423/648.1 |
| 5,861,137 A | 1/1999 | Edlund | 423/652 |
| 5,938,800 A | 8/1999 | Verrill et al. | 48/127.9 |
| 5,997,594 A * | 12/1999 | Edlund et al. | 48/76 |
| 6,180,081 B1 | 1/2001 | Poschmann et al. | |
| 6,231,831 B1 | 5/2001 | Autenrieth et al. | 423/648.1 |
| 6,294,149 B1 | 9/2001 | Autenrieth et al. | 423/648.1 |

FOREIGN PATENT DOCUMENTS

| | | | |
|---|---|---|---|
| EP | 1024111 A1 | 8/2000 | C01B/3/32 |
| JP | 06345408 | 12/1994 | |
| WO | 99/18392 | 4/1999 | F23C/11/00 |

OTHER PUBLICATIONS

Search Report dated Oct. 9, 2002.

* cited by examiner

*Primary Examiner*—Stanley S. Silverman
*Assistant Examiner*—Maribel Medina
(74) *Attorney, Agent, or Firm*—Y. Grace Tsang

(57) ABSTRACT

Disclosed is a new process and apparatus for steam reforming of any vaporizable hydrocarbon to produce $H_2$ and $CO_2$, with minimal CO, and no CO in the $H_2$ stream, using a membrane steam reforming (MSR) reactor and flameless distributed combustion (FDC) which provides great improvements in heat exchange efficiency and load following capabilities to drive the steam reforming reaction. The invention also pertains to a zero emission hybrid power system wherein the produced hydrogen is used to power a high-pressure molten carbonate fuel cell. In addition, the design of the FDC-MSR powered fuel cell makes it possible to capture good concentrations of $CO_2$ for sequestration or use in other processes.

130 Claims, 7 Drawing Sheets

INTEGRATED FLAMELESS DISTRIBUTED COMBUSTION/STEAM REFORMING MEMBRANE REACTOR FOR HYDROGEN PRODUCTION AND USE THEREOF IN ZERO EMISSIONS HYBRID POWER SYSTEM

This application claims the benefit of U.S. Provisional Application No. 60/273,354 filed Mar. 5, 2001, the entire disclosure of which is hereby incorporated by reference.

FIELD OF THE INVENTION

This invention relates to a process and apparatus for the production of pure hydrogen by steam reforming, and to the use of the hydrogen in a zero emission hybrid power system incorporating a fuel cell. The process integrates the steam reforming and shift reaction to produce pure hydrogen with minimal production of CO and virtually no CO in the hydrogen stream, provides for $CO_2$ capture for sequestration, employs a steam reforming membrane reactor, and is powered by flameless distributed combustion that provides great improvements in heat exchange efficiency.

BACKGROUND OF THE INVENTION

The production of electrical power in the most efficient manner with minimization of waste is the focus of much research. It would be desirable to improve efficiency in the production of electricity, separate and use by-product $CO_2$ in other processes, and produce minimal $NO_x$. The wide availability of natural gas with the highest H:C ratio (4:1) of any fossil fuel makes it a prime candidate for electricity production with minimum $CO_2$ emissions.

In the production of electricity by conventional means only about 35% of the hydrocarbon fuel is converted to electricity and approximately 5% of that is lost over power lines. Even with modern turbines the efficiency is about 45%. In the case of the additional production of electricity by a "bottom cycle" where high temperature exhaust is used to boil water and produce more electricity, the combined efficiency is only about 60% in the lab. In addition, though about 3–5% m $CO_2$ is produced as exhaust from turbines, it is very difficult and expensive to capture due to the low concentration in the exhaust streams.

Electricity can be produced in fuel cells using pure hydrogen. Hydrogen production is commercially proven, but expensive. One method of producing hydrogen is steam methane reforming where hydrocarbons and water are reacted to form CO and $H_2$, followed by a separate water-gas-shift reaction where CO is reacted with $H_2O$ to form $CO_2$ and $H_2$. The commercial application of these reactions in many refineries commonly involves a series of reactors including a steam reforming reactor, and several post reactors to address the production of CO in the reformer. The post reactors include a high temperature shift reactor, a low temperature shift reactor, and a $CO_2$ absorber separator. Water and $CO_2$ separation is necessary to achieve pure hydrogen. The reforming reactor is run at high pressure to avoid hydrogen recompression downstream. The pressure lowers the equilibrium conversion since reforming produces a positive net mole change. The steam reforming reaction is very endothermic, about 206 kJ/mole; and the shift reaction is exothermic, providing about 41 kJ/mole. The conventional steam reforming reactors are operated above 900° C. to push the equilibrium toward complete formation of CO and $H_2$. The high temperature causes severe corrosion and stress problems on the equipment. Steam reforming reactors are generally large to accomplish economies of scale. In addition, the typical operation of the shift reactor at a lower temperature than the reforming reactor makes it impractical to combine these two chemical reactions in one reactor. Furthermore, designs currently known do not lend themselves to being scaled down to a smaller size or to making it possible to efficiently control the temperature at various points.

Even if a reactor was capable of producing only $CO_2$ and $H_2$ and the conventional post reactors could be eliminated, the issue of $CO_2$ separation would remain.

In experimental work the use of membranes to harvest hydrogen from a reforming process is known. For example, U.S. Pat. No. 4,810,485 discloses a hydrogen forming process which comprises conducting in a hydrogen production zone a chemical reaction forming mixed gases including molecular hydrogen, contacting one side of a hydrogen ion porous and molecular gas nonporous metallic foil with said mixed gases in said hydrogen production zone, dissociating said molecular hydrogen to ionic hydrogen on said one side of said metallic foil, passing said ionic hydrogen through said metallic foil to its other side, and withdrawing hydrogen from said other side of said metallic foil, thereby removing hydrogen from said hydrogen production zone. This process takes place at a temperature of from about 1000° F. to 1400° F.

U.S. Pat. No. 5,525,322 discloses a process for the simultaneous recovery of hydrogen and hydrogen isotopes from water and from hydrocarbons which comprises mixing carbon monoxide and water with the feed mixture forming a gas mixture such that the reversible reactions $CO+H_2O \leftrightarrows CO_2+H_2$ and $CH_4+H_2O \leftrightarrows CO+3H_2$ can occur, flowing the gas mixture over a heated nickel catalyst such that the equilibrium of the reactions permits subsequent generation of H isotopes, contacting the resulting gas mixture with a heated palladium membrane, and removing the H isotopes which have permeated the Pd membrane. The reactor is heated by enclosing it in a split-hinge tube furnace.

U.S. Pat. No. 5,741,474 discloses a process for producing high-purity hydrogen which includes heating a reforming chamber provided with a hydrogen-separating membrane, feeding into the reforming chamber hydrocarbon, steam, and oxygen or air to give rise to steam reforming and partial oxidation therein to produce a reaction gas, and passing the reaction gas through the hydrogen-separating membrane to recover high-purity hydrogen. The heat possessed by the portion of the reaction gas not permeable into the hydrogen-separating membrane and the heat generated by the partial oxidation are utilized for the heating and reforming of the hydrocarbon, water and oxygen or air.

U.S. Pat. No. 5,861,137 discloses a compact, mobile steam reformer that includes a tubular hydrogen permeable and hydrogen selective membrane. A reforming bed surrounds at least part of the membrane. An inlet to the reforming bed receives a mixture of alcohol or hydrocarbon vapor and steam and an outlet from the reforming bed releases reforming byproduct gases. A heating element heats the reforming bed to an operating temperature and a second bed including a methanation catalyst is placed at the permeate side of the membrane. A reformer outlet withdraws hydrogen gas from the second bed. In one aspect, the heating element is a third bed including an oxidation catalyst surrounding at least a portion of the first bed. The reforming byproduct gases released from the reforming bed mix with an air source and catalytically ignite to generate heat and thermally support the process of reforming within the reforming bed.

U.S. Pat. No. 5,229,102 discloses a steam reforming process that does not require a shift reactor. It requires a gas turbine to produce hot exhaust gases. That reference discloses a process employing the steps of:

a) providing a generally tubular, porous, ceramic membrane, and providing a heated reaction zone in a container into which the membrane is received, b) wherein the membrane carries a catalytically active metallic substance, c) passing a hydrocarbon and steam containing first fluid stream into the reaction zone and into contact with one side of the membrane to produce $CO_2$ and $H_2$, d) and passing a stream containing second fluid stream adjacent the opposite side of the membrane in such manner as to promote hydrogen diffusion through the membrane from said one side to said opposite side thereof, e) and removing hydrogen from the opposite side of the membrane.

This process takes place at lower temperatures than are typical of conventional reforming, i.e. 300–750° C., however it requires a gas turbine or gas engine to produce hot exhaust gas and the generated heat is transferred into the reaction zone to maintain the temperature.

U.S. Pat. No. 5,938,800 discloses a compact hydrogen generation system that comprises a fuel means for supplying a pressurized, vaporized fuel and steam mixture, a steam reformer having a catalyst bed in communication with the fuel means, and hydrogen filtration means for filtering and removing hydrogen produced in the catalyst bed from the fuel and steam mixture and means for providing same to a collection header, and burner means integrated with the steam reformer for providing hot flue gases to heat the catalyst bed and to make the vaporized fuel and steam mixture by combustion of a least one of an off-gas produced by the steam reformer and an auxiliary fuel, whereby the steam reformer, fuel means and burner means are mobile and lightweight.

It would be desirable in the art to provide a steam reformer reactor design for producing hydrogen completely free of carbon and carbon oxides and with minimal production of $NO_x$. If the pure hydrogen produced could be used to create power in a hybrid system that could be compact in design and provide 71% or greater efficiency in the production of energy it would represent a distinct advance in the art. In addition, it would be desirable if lower temperatures could be used and if the entire process permitted more control over temperatures at various points, or load-following capabilities. Furthermore, if the process produced $CO_2$ in higher concentrations and greater purity than other processes in the art, and the $CO_2$ could be sequestered for other uses, it would be extremely desirable. Such an integrated system would demonstrate far greater efficiency than any power generating system currently available.

SUMMARY

In accordance with the foregoing, the present invention accomplishes these objectives and is a new process and apparatus for steam reforming of any vaporizable hydrocarbon to produce $H_2$ and $CO_2$, with minimal CO, and virtually no CO in the $H_2$ stream, said process being accomplished in one reactor, at lower temperatures than those used in conventional stream methane reforming reactors, constantly removing pure hydrogen, and using as a heat source flameless distributed combustion which provides great improvements in heat exchange efficiency and load-following capabilities to drive the steam reforming reaction. Similar efficiency and load-following is simply not possible with conventional firebox steam reformer furnace designs and multi-reactor shift units. The flameless distributed combustion heat source makes it possible to transfer between 90 and 95% of the heat to the reacting fluids. In another embodiment, the invention is also a zero emission hybrid power system wherein the produced hydrogen is used to power a high-pressure internally or externally manifolded molten carbonate fuel cell. The system is capable of achieving 71% or greater efficiency in the conversion of fuel to electricity. In addition, the design of this flameless distributed combustion-membrane steam reforming reactor (FDC-MSR) fueled hybrid system makes it possible to capture high concentrations of $CO_2$ for sequestration or use in other processes. Finally, the design of the system can be scaled down to a mobile, lightweight unit.

The process for steam reforming of any vaporizable hydrocarbon to produce purified $H_2$ and $CO_2$ comprises:

a) Providing a generally tubular reforming chamber having one or more inlets for vaporizable hydrocarbons and steam and one or more corresponding outlets for by-product gases, including $H_2O$, and $CO_2$, with a flow path in between said inlet and outlet, and having one or more inlets for sweep gas (which may be $H_2O$ in the form of steam, or other gas such as recycled $CO_2$, nitrogen or condensable hydrocarbons) and corresponding outlets for the sweep gas and hydrogen, with a flow path between said inlet and outlet, and having one or more inlets for preheated air and corresponding inlets for fuel gas mixtures, with a flow path between said inlets containing a plurality of flameless distributed combustion heaters, wherein said flow path for vaporizable hydrocarbon and flow path for sweep gas form two concentric sections with an annulus between having a reforming catalyst therein;

b) Feeding a vaporizable hydrocarbon and steam into said reforming chamber through said inlet for a vaporizable hydrocarbon and steam;

c) Flowing said vaporizable hydrocarbon over a reforming catalyst;

d) Causing both steam reforming and the shift reaction to take place in said reforming chamber; and e) Conducting said reforming in the vicinity of a hydrogen permeable and hydrogen-selective membrane, whereby pure hydrogen permeates said membrane;

f) Wherein heat to drive said reaction is provided by said flameless distributed combustors.

The process of the present invention may also be described as a process for the production of hydrogen, comprising:

a) reacting steam with a vaporizable hydrocarbon at a temperature of from about 200° C. to about 700° C. and at a pressure of from about 1 bar to about 200 bar in a reaction zone containing reforming catalyst to produce a mixture of primarily hydrogen and carbon dioxide, with a lesser amount of carbon monoxide;

b) providing heat to said reaction zone by employing flameless distributed combustion thereby driving said reaction;

c) conducting said reaction in the vicinity of a hydrogen-permeable and hydrogen-selective membrane, whereby hydrogen formed in said reaction zone permeates through said selective membrane and is separated from said carbon dioxide and carbon monoxide.

In order to produce electricity with zero emissions and capture $CO_2$, the pure hydrogen which permeates the membrane may be directed to the anode of a high pressure molten carbonate fuel cell and the by-products from the reforming reaction are directed to the cathode of said fuel cell. The high purity hydrogen may also be directed to other types of fuel cells such as PEM (proton exchange membrane) fuel cells or SOFC (solid oxide fuel cells) and the like.

The invention also pertains to an apparatus comprising a membrane steam reformer heated by flameless distributed combustion to produce high purity hydrogen that may be used for a variety of purposes including as fuel to a high pressure molten carbonate fuel cell or a PEM fuel cell. The integrated flameless distributed combustion-membrane steam reforming reactor (FDC-MSR) of the present invention comprises:

A reforming chamber comprising a generally tubular reactor having two concentric sections comprising a larger-outside section and a smaller inside section and an annulus between said sections, wherein said outside section has an inlet for preheated air and a corresponding inlet for fuel gas, with a flow path between and a plurality of flameless distributed combustors arranged in a circular path in said outside section; and wherein said inside section has an inlet for sweep gas and an outlet for sweep gas and $H_2$, and said annulus has an inlet for vaporizable hydrocarbons and an outlet for by-product compounds and a hydrogen-selective, hydrogen-permeable membrane positioned either on the inside or outside of the annular section. In a further embodiment of the invention said reforming chamber is in communication with a high pressure molten carbonate fuel cell, wherein the outlet for hydrogen from the reformer is in communication with the anode of said fuel cell and the outlet for by-product compounds is in communication with the cathode of said fuel cell.

The integrated FDC-MSR process and apparatus of this invention is capable of producing high purity hydrogen with minimal production of CO and virtually no CO in the hydrogen stream. By practice of the invention it is possible to produce hydrogen having a high purity, e.g., a purity on a dry basis of greater than 95%. The present invention can be used to produce hydrogen having purities as high as 97%, 99%, or under optimum conditions 99+%. The effluent (by product) stream from the MSR reactor will typically contain more than about 80% $CO_2$ on a dry basis, e.g., 90% $CO_2$, 95% $CO_2$ or 99% $CO_2$, and less than about 10% CO on a dry basis, e.g., less than about 5% CO, preferably less than 1% CO Total heat management and turbines may be included in the system to increase the efficiency and produce additional electricity or to do useful work such as to compress gases or vapors.

BRIEF DESCRIPTION OF THE DRAWINGS

FIG. 1 is a schematic diagram of the novel membrane steam reforming (MSR) reactor with a flameless distributed combustion (FDC) heater section, catalyst section, and permeate section placed in order from the outside in.

DETAILED DESCRIPTION OF THE INVENTION

Figure 1:
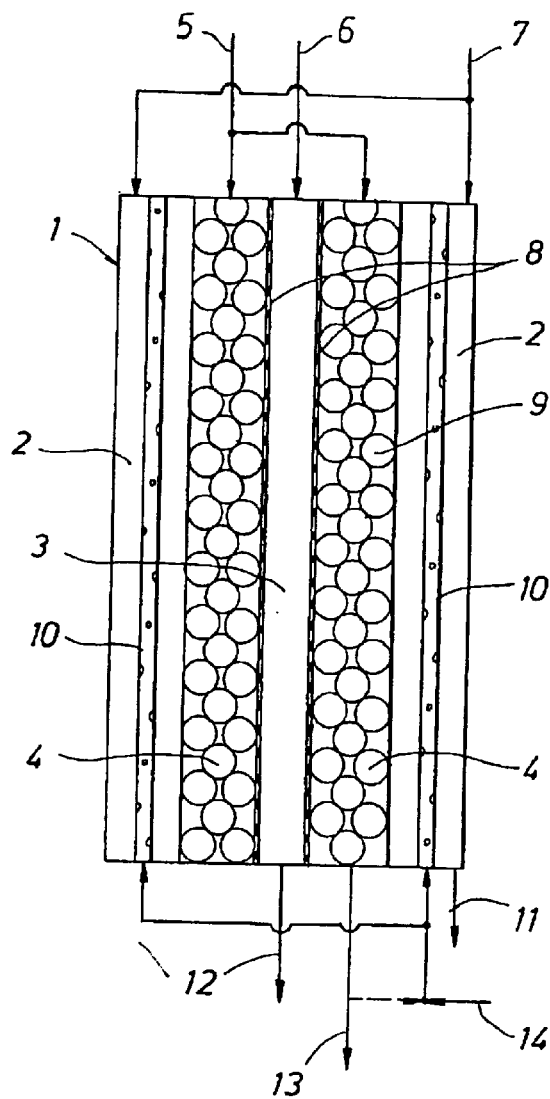

One aspect of the present invention is a flameless distributed combustion heated membrane steam reformer hydrogen generator. In the design of the invention there are disclosed distinct improvements in overall efficiency, particularly size, scalability and heat exchange. The invention typically employs only one reactor to produce the hydrogen versus typically four reactors used in conventional processes, and part of the heat load is supplied by reaction (R2). The design of the invention captures essentially all of the heat in the reaction chamber since heat exchange occurs on a molecular level, which reduces the overall energy requirements.

The reactions and enthalpies typically involved in a steam reforming process can be represented as follows:

(R1) Reforming:

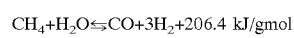

$$CH_4 + H_2O \leftrightarrows CO + 3H_2 + 206.4 \text{ kJ/gmol}$$

(R2) Water-gas shift:

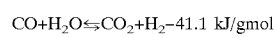

$$CO + H_2O \leftrightarrows CO_2 + H_2 - 41.1 \text{ kJ/gmol}$$

(R3) Combination:

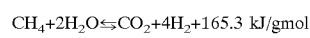

$$CH_4 + 2H_2O \leftrightarrows CO_2 + 4H_2 + 165.3 \text{ kJ/gmol}$$

Using conventional methods, it is not possible to integrate the reforming and shift reactions into one reactor since the reactors must be operated at significantly different temperatures to obtain high product yields. Table 1 shows the typical values of the equilibrium constants for the three reactions (R1) to (R3) at 500° and 900° C.

TABLE 1

Values of the equilibrium constants for reactions (1)–(3) at 500 and 900° C.

| Reaction | 500° C. | 900° C. |
|---|---|---|
| $CH_4 + H_2O \longleftrightarrow CO + 3H_2$ | 0.015072862 $Bar^2$ | 851.0293252 $Bar^2$ |
| $CO + H_2O \longleftrightarrow CO_2 + H_2$ | 5.519535307 | 0.623747734 |
| $CH_4 + 2H_2O \longleftrightarrow CO_2 + 4H_2$ | 0.083195196 $Bar^2$ | 530.8276134 $Bar^2$ |
| $K_1/K_3 = 1/K_2$ | 0.181 | 1.61 |

It is shown from the ratio of $K_1/K_3$ that high temperature favors the reaction (R1).

Chemical equilibrium and heat transfer limitations are the two factors that govern the production of hydrogen from methane in conventional reactors. These factors lead to the construction of large reactors fabricated from expensive high temperature tolerant materials. They are enclosed in high temperature furnaces that are needed to supply the high heat fluxes.

In the present invention the two major limitations of chemical equilibrium and heat transfer are overcome by the innovative combination of an in-situ membrane separation of hydrogen in combination with a flameless heat source comprising flameless distributed combustion (FDC) that makes it possible to more efficiently use all the energy in the system, as well as provide load following capabilities.

Hydrogen removal across the membrane shifts the methane conversion to high values, well above the equilibrium condition at 500° C. Integrating the reforming and shift reactions into one reactor reduces the energy needed to produce the hydrogen since reaction (R2) is exothermic and partially offsets the endothermic reaction (R1). Therefore, the combination reaction, (R3), requires the lowest enthalpy input to convert methane to hydrogen. Moreover, reaction (R3) produces more hydrogen per unit methane (twice as much as that contained in $CH_4$) and, finally, a most attractive feature is that it produces $CO_2$ at the expense of CO.

The reformer of the present invention reduces the operating temperature of the steam reforming reactor close to the lower temperature used in a shift reactor. With the temperatures for the steam reforming and shift closer, both operations are combined into one reactor. With both reactions occurring in the same reactor the exothermic heat of reaction of the shift reaction is completely captured to drive the endothermic steam reforming reaction. This reduces the total energy input for the sum of the reactions by 20%. The lower temperature reduces stress and corrosion and allows the reactor to be constructed from much less expensive materials. Combining the operations also reduces the capital and operating cost since only one reactor, instead of two or three, is required, and since heat exchange equipment on the shift reactor is not required, the reactor design of the present invention allows the unit to be scaled to smaller size.

The in-situ membrane separation of hydrogen employs a membrane fabricated preferably from an appropriate metal or metal alloy on a porous ceramic or porous metal support, as described below, to drive the equilibrium to high conversions. With constant removal of the hydrogen through the membrane, the reactor can be run at much lower than the commercially practiced temperatures of 700–900+° C. A temperature of 500° C. is sufficient to drive the kinetics to high conversions when the equilibrium is shifted using the hydrogen separation membrane. At this temperature the selectivity to $CO_2$ is almost 100%, while higher temperatures favor the formation of CO as a major product.

The advantages of the use of the membrane in the reactor are summarized as follows:

The yields are higher than that possible at equilibrium and may be as high as 100%.

Efficient operation at lower temperatures allows production of $CO_2$ as the main byproduct. The production of $CO_2$ as the main byproduct has enthalpy, hydrogen yield, and waste disposal advantages. Also, it permits the construction of reactors from much less expensive materials.

High pressure favors the equilibrium, whereas, in contrast, in traditional systems equilibrium is not favored. The net mole change in the catalyst side is negative when more than 50% of produced hydrogen is permeated (see reaction (3)). Moreover, pressure helps drive the hydrogen through the membrane. Finally, the high pressure keeps the gas velocity at a reasonably low level of about 1 m/s or less, thus, protecting the catalyst from attrition.

There is reduced catalyst deactivation and coking tendency at the lower temperature and higher pressure, even though the hydrogen partial pressure is lower than a conventional reactor. This allows the catalyst to deactivate slower and require less frequent replacement.

Pure hydrogen is produced (diluted in steam or other sweep gas) on the permeate side of the membrane without any other impurities that might affect fuel cell performance. The remaining stream contains high concentration $CO_2$, a stream ideal for $CO_2$ sequestration. Trace amounts of the methane, hydrogen, and CO from the MSR effluent may be oxidized in a catalytic converter to produce $CO_2$ and $H_2O$ before sequestration.

The fact that the membrane steam reformer of the invention can operate efficiently at lower temperatures permits the use of less expensive materials in the construction. Materials typically used in reactors are alloys having high concentrations of chromium and nickel, such as, for example, a composition known in the art as HK40 containing 25% Cr and 20% Ni, the balance being iron. Lower temperatures would allow the use of alloys containing more stainless steel, such as, for example, AISI 304 stainless steel, containing 18% Cr and 8% Ni, the balance comprising iron.

Another advantage of the integrated FDC-MSR reactor of the invention is that it does not require a preformer to process heavier feeds. Conventional reformers use a preformer to convert heavier feeds to methane upstream from the main steam reforming reactor. The reactor of the present invention permits the processing of less expensive heavier feeds with unfavorable H:C ratios without the use of a preformer.

FIG. 1 shows a schematic diagram of the membrane steam reforming reactor with flameless distributed combustion (FDC) heater section, catalyst section, and permeate section. FIG. 1 shows the reactor 1 consists of two concentric sections. The outer concentric section 2 is the FDC heater section, while the inner concentric section 3 is the permeate section. The annulus, 4, in between is the catalyst section. Reforming catalyst is loaded into the annulus section 4 wherein the above described reactions take place. (Section 4 is also variously referred to as the catalyst section, the reaction section or reaction zone). The membrane, 8, is represented on the inside of the small section, 3, (the permeate section) in FIG. 1. The FDC fuel tubes, 10, are placed in a circular pattern in the FDC heating section, while air flows in that annular region surrounding the fuel tubes. Fuel tubes 10 have a plurality of openings or nozzles spaced along the length of the fuel tubes. The openings or nozzles provide communication between the fuel tubes and the annular portion of the heating section through which air or other oxidant flows. The openings are sized and spaced along the fuel tube in a manner to achieve the desired heat distribution along the length of the FDC heating section 2, which substantially surrounds catalyst section 4, thereby driving the reactions taking place in section 4. While FIG. 1 shows the FDC heater section, catalyst section and permeate section placed in order from outside in, the location of the membrane and FDC heater section can be reversed to achieve higher membrane area.

The feed gas stream containing a mixture of vaporizable hydrocarbon (e.g. naphtha, methane or methanol) and $H_2O$ with a minimum overall O:C ratio of 2:1 enters catalyst section 4 at 5. If used, sweep gas for promoting the diffusion of hydrogen through the membrane enters the top of the permeate section 3 at 6. Alternatively, sweep gas can be introduced into the permeate section by means of a stinger pipe fitted to bottom of the permeate section. In case of this alternative, hydrogen in sweep gas would exit the permeate zone at the bottom of the permeate section at 12. Optionally, the stinger pipe to introduce the sweep gas may be connected at the top of the permeate section in which case the hydrogen and sweep gas would exit at the top of this section. Preheated air enters the FDC heater section at 7. Hydrogen (pure or in sweep gas) exits at 12. Flue gas from the FDC heater section exits at 11. Unreacted products and by-products (e.g., $CO_2$, $H_2O$, $H_2$, $CH_4$, and CO exit catalyst section 4 at 13. Fuel 14 (which may include a portion of the hydrogen exiting the permeate section or part of the reactor effluent) enters the FDC fuel tubes 10 as shown and is mixed with the preheated air in the FDC heating section. It is also possible to remove the produced hydrogen using a vacuum instead of a sweep gas.

Figure 2:
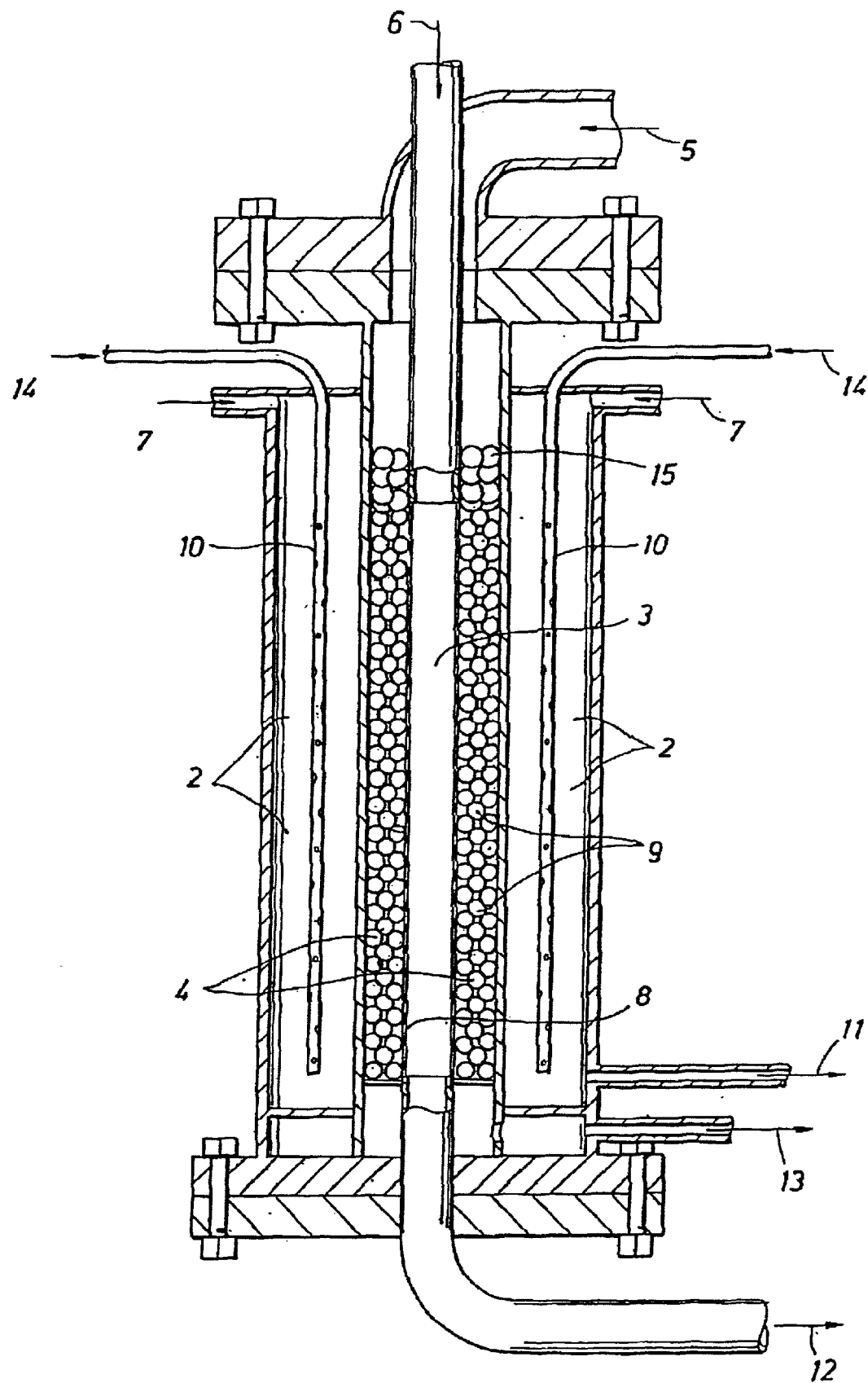
FIG. 2 is a schematic diagram of another embodiment of the novel FDC-MRS reactor of the invention.

FIG. 2 shows a schematic diagram of another embodiment of the integrated FDC-MSR reactor of the present invention. The reactor depicted in FIG. 2 similar to the reactor in FIG. 1, has an outer concentric FDC heater section 2 and an inner permeate section 3, with an intermediate catalyst section 4 containing catalyst 9. The catalyst section also contains a layer of inerts 15 at the top of the catalyst section. A feed stream containing a vaporizable hydrocarbon (e.g. naphtha, methane or methanol) and steam enter the reactor at 5, while sweep gas, if used, enters the reactor at 6. Fuel for the FDC heater section enters fuel tubes 10 at 14. However, in the case of this embodiment the fuel enters the FDC heating section at the top of the section and flows concurrently with the preheated air (or other oxidant) which enters the FDC heating section at 7. The flow in the FDC heating section is also concurrent with the flow of the reactant gases in section 4. Fuel tubes 10 have a plurality of openings or nozzles sized and spaced along the length of the fuel tubes so that the amount of fuel mixing with the air or oxidant in the annular part of the FDC section surrounding the fuel tubes can be controlled to achieve the desired heat distribution along the length of the FDC heating section which surrounds the reaction section. Flue gas containing very low levels of $NO_x$ leaves the FDC heater section at 11, while effluent from the catalyst (reaction) section exits at 13. Hydrogen formed in reaction section permeates through hydrogen-selective, hydrogen-permeable, membrane 8 and exits the permeate section (as such or with sweep gas) at 12.

The novel integrated FDC-membrane steam reforming reactor of the present invention operates at a lower temperature than used in commercial steam methane reformers. A suitable temperature is less than about 700° C., for example in the range of from about 300 to about 650° C. In some cases lower temperatures, e.g., as low as about 200° C. can be used up to about 600° C. A preferred range is from about 400 to about 550° C., more preferably from about 400° C. to about 500° C. Suitable pressure is in the range of from about 1 to about 200 bar, preferably from about 10 to about 50 bar. The simulation in Example 1 of the present invention was carried out at a temperature of about 500° C. and 30 Bar. This low temperature achieves high selectivity to $CO_2$ and negligible selectivity to CO.

Any vaporizable (or optionally oxygenated) hydrocarbon can be used in the present process or apparatus, including, but not limited to, methane, methanol, ethane, ethanol, propane, butane, light hydrocarbons having 1–4 carbon atoms in each molecule, and light petroleum fractions like naphtha at boiling point range of 120–400° F., which is a typical feed for commercial steam reformers. Petroleum fractions heavier than naphtha can also be employed like diesel or kerosene or jet fuel at boiling point range of 350–500° F., or gas oil at boiling point range of 450–800° F. Hydrogen, carbon monoxide and mixtures thereof, e.g., syngas, can also be used in the process and apparatus of the present invention, and are included in the definition of "vaporizable hydrocarbon". Methane was used in the examples to demonstrate the process.

Another advantage of the FDC-MSR reactor of the invention is that one can employ lower oxygen to carbon ratios (O:C ratios) than with conventional steam methane reformers without incurring coking problems. With conventional steam methane reformers the typical minimum O:C ratio which can be used is about 3:1 before incurring moderate to severe coking problems. With the FDC-MSR process and apparatus of the present invention it is possible to use O:C ratios as low as 2.8, down to 2.6, without coking problems, with the minimum O:C ratio being about 2:1. This results in lower energy costs if methane is used as the feed in the present invention, since lower steam to methane ratios can be used thus requiring less energy to vaporize water. Because of the ability to operate at lower O:C ratios, it is also possible to use heavier, less expensive feeds in the FDC-MSR reactor of the present invention than can be used in conventional steam methane reformers.

In another embodiment of the invention, the integrated FDC-MSR process and apparatus of the invention can be used to perform water-gas-shift reactions on syngas mixtures (i.e., mixtures of hydrogen and carbon monoxide) produced from conventional processes like Catalytic Partial Oxidation (CPO), Steam Methane Reforming (SMR) and Autothermal Reforming (ATR). The integrated FDC-MSR reactor is well suited for this since it produces high purity hydrogen and converts carbon monoxide to carbon dioxide and more hydrogen. Thus, the versatile FDC-MSR reactor of the invention is capable of replacing the high temperature shift, low temperature shift and methanation reactors and the hydrogen purification section. A mixture of syngas and vaporizable hydrocarbon can also be used to yield a net reaction which may be either endothermic, thermally neutral or slightly exothermic.

The reactor annulus is packed with steam reforming catalyst and equipped with a perm-selective (i.e., hydrogen-selective) membrane that separates hydrogen from the remaining gases as they pass through the catalyst bed. The steam reforming catalyst can be any known in the art. Typically steam reforming catalysts which can be used include, but are not limited to, Group VIII transition metals, particularly nickel. It is often desirable to support the reforming catalysts on a refractory substrate (or support). The support is preferably an inert compound. Suitable compounds contain elements of Group III and IV of the Periodic Table, such as, for example the oxides or carbides of Al, Si, Ti, Mg, Ce and Zr. The preferred support composition for the reforming catalyst is alumina.

The catalyst used in the examples to demonstrate the present invention was nickel on porous alumina.

As the hydrogen is formed in the catalyst bed, it is transported out through the hydrogen-permeable separation membrane filter. Advantages of this technology include the capacity to separate essentially pure hydrogen from any poisons that may also be present, including CO and $H_2S$, and from other fuel diluents. The poisons do not pass through the separation membrane, which is fabricated from one of a variety of hydrogen-permeable and hydrogen selective materials including ceramics, carbon, and metals.

Membranes suitable for use in the present invention include various metals and metal alloys on a porous ceramic or porous metallic supports. The porous ceramic or porous metallic support protects the membrane surface from contaminants and, in the former choice, from temperature excursions. The preferred membrane support is porous stainless steel. Alternatively, the Pd layer can be deposited on the outside of the porous ceramic or metallic support, in contact with the catalyst section. The inertness, range of porosity available, and the fact that, to some extent, alumina can function as an insulator, also make it a good choice for the support. Additional advantages include the fact the alumina can function to filter off material that might deposit on the membrane and plug it. The use of alumina also makes it possible to control the distance of the membrane from the catalyst section, and, therefore, control the temperature drop across the operating membrane at a given temperature and maximum effectiveness, and lessens the likelihood of overheating. It is also possible to use the ceramic support as an insulating layer to keep the membrane at the design temperature. The temperature of the sweep gas may also be controlled to adjust the membrane temperature. The membrane permeate side can provide extra heat transfer area, with superheated steam used as sweep gas and also as a heat transfer fluid for heating and temperature control. Also, a combustion catalyst with some oxygen injection via a perforated tube can oxidize some of the produced hydrogen to supply the enthalpy to drive the steam reforming reaction. The presence of Pd or Pd-alloy in the vicinity of the air and hydrogen mixture makes this reaction occur at lower temperature than the autoignition temperature of hydrogen and air (which is 571° C.). This results in a heat source that does not exceed the maximum operating temperature of the preferred Pd membrane, which is around 550° C. This internal heating concept is based on flameless distributed combustion concepts, and is an example of inverse combustion, and may be used with or with out catalyst surrounding the perforated tube that supplies the oxygen. Optionally, a suitable methanation catalyst may be placed in the permeate compartment as an extra safeguard to CO penetration through the hydrogen membrane if small pinholes develop. This catalyst could convert CO to methane and keep the CO level in the hydrogen stream always in the parts per million range. Typically, the CO level in the hydrogen stream exiting the membrane steam reforming reactor of the present invention will be less than about 10 ppm, e.g., less than 5 ppm, 2 ppm, 1 ppm or 0.1 ppm.

Preferred materials for fabricating said membrane include mainly, but not exclusively, metals of Group VIII, including, but not limited to Pd, Pt, Ni, Ag, Ta, V, Y, Nb, Ce, In, Ho, La, Au, Ru etc. particularly in the form of alloys. Pd and Pd alloys are preferred. The membrane used to demonstrate the present invention was a very thin film of a palladium alloy having a high surface area. Membranes of this type can be prepared using the methods disclosed in U.S. Pat. No. 6,152,987, which is incorporated by reference herein in its entirety. Platinum or a platinum alloy would also be suitable.

As mentioned, with respect to FIG. 1, the membrane is pictured on the inside of the smaller (i.e., the inner) concentric section, which reduces the surface area to a minimum. In order to obtain greater flux the membrane could be placed on the outside of the larger section of the reactor. Changes in geometry of the membrane permit a number of options depending on requirements as will be apparent to those skilled in the art. For example, one option is to place the membrane on the outside of the reactor wall to achieve higher surface area. If the membrane in Example 1 was placed on the outside tube of the 14 cm diameter, the surface area value can be increased by a factor of 2. Also, it is possible to use more tubes of smaller diameter to achieve a higher surface to volume ratio. A jagged cross-section of the membrane tube (with a star shape for instance) could increase the surface area. Finally, the space velocity of the gas may be reduced by 2–3 or 2200–3300 $h^{-1}$ to allow more time for the hydrogen to diffuse through the membrane.

The reactor model indicates that the reactor is $H_2$ transfer limited while the reaction kinetics is very fast. This means that improvements in membrane permeability will allow higher space velocities or higher conversion.

The hydrogen separation membrane used in Example 1 was a Pd-alloy (Ag, Ta, V, etc.) thin film of 1 $\mu$m or less with a high surface area. The Pd-alloy film is supported on a porous ceramic matrix that acts as the mechanical support and a filtration medium to prevent coke from covering the membrane. The porous ceramic support also acts as an insulator to reduce heat losses from the reactor. It also keeps the membrane at the specified temperature for optimum performance and stability. This special design geometry is highly efficient. The permeability used for the base case is 7.8 $10^{-2}$ std-$m^3/m^2/s/Bar^{0.5}$ which is a number 2–30 times higher than reported in the literature (see Table 2).

The issue of optimum permeability is dependent on producing membranes of 3–10 times smaller thickness than currently published or finding an alloy of better permeability than the reported alloys. Membranes between 25–75 $\mu$m thickness are commercially available. Alfa Aesar offers 5 $\mu$m thick unsupported Pd foils at 0.05 m×0.05 m and Souleimanova et al, have made supported membranes of 5 microns thickness. ECN and Haldor Topsoe have made 4 $\mu$m thick Pd films on ceramic supports. Work in the art indicates that developmental advances will permit commercial manufacturers to make membranes layers thinner than 1 $\mu$m. Table 2 below notes the values of per-meability found in the literature. The value used in the model is only one order of magnitude higher than the commercial Pd—Ag film and even closer to the Pd—Ta value of Buxbaum.

TABLE 2

Different values of hydrogen permeability over Pd or Pd-alloy membranes. Temperature increases the permeability, so that the value at 400° C. may be about 20% lower than at 500° C.

| Permeability, $sm^3/m^2/s/Bar^{0.5}$ | Membrane Type | Source | Relatve Factor (corrected to 500° C.) |
|---|---|---|---|
| 0.00307 (400° C.) | Pd-coated Ta tubes, 50 $\mu$m tube wall thickness | REB Research commercial literature | 0.53 |
| 0.0045 (600° C.) | Pd layer of 5 $\mu$m | Souleimanova et. al, Journal of Membrane Science, 166/2, 249 (2000). | 0.66 |
| 0.00445 (400° C.) | Pd—Cu alloy at 25 $\mu$m film | Oremet-Wah Chang (commercial literature) | 1.00 |
| 0.00556 (350° C.) | Pd—Ag on PSS 316L at 11.7 $\mu$m film with $Fe_2O_3$ layer | Prof. Ed Ma, seminar abstract and patent WO 99/30806 | 1.45 |
| 0.00815 (350° C.) | Pd—Ag on ceramic at 4 $\mu$m film | ECN non-confidential personal communication | 2.13 |
| 0.00604 (300° C.) | 10–15 $\mu$m Pd | Walter Juda et al., U.S. Pat. No. 6,103,028 | 1.88 |
| 0.0104 (420° C.) | Pd-coated Ta tubes, 70 $\mu$m Ta tube wall thickness, 3–10 $\mu$m Pd thickness | Buxbaum, R.E. et al, Hydrogen transport through tubular membranes of palladium-coated tantalum and niobium, Ind. Engng Chem Res, 35, 530–537, 1996 | 2.21 |

TABLE 2-continued

Different values of hydrogen permeability over Pd or Pd-alloy membranes. Temperature increases the permeability, so that the value at 400° C. may be about 20% lower than at 500° C.

| Permeability, $sm^3/m^2/s/Bar^{0.5}$ | Membrane Type | Source | Relatve Factor (corrected to 500° C.) |
|---|---|---|---|
| 0.0204 (520° C.) | Pd layer of 3 $\mu$m | Yeung et al., Studies in Surface Science and Catalysis, 101, 1996. | 3.45 |
| 0.042 (350° C.) | Pd layer of 4 $\mu$m on ceramic tube | Haldor-Topsoe-4th Intl Conf. On Catalysis in Membrane Reactors-2000; abstract and paper | 10.9 |
| 0.078 (500° C.) | Pd alloy $\leq 1$ $\mu$m thick | Assumed in Examples 1 & 2 | 13.7 |

Steam is not known to cause a problem in membrane stability, however, if any problems developed at higher temperatures, the replacement of water with recycled carbon dioxide or nitrogen as sweep gas is a viable alternative. Other sweep gases could be used, like hydrocarbons, or mixtures thereof, with a moderate boiling point of 100–400° C. These would condense at temperatures closer to the permeate outlet temperature and thus reduce the energy loss during cooling and reheating of the sweep gas. Hydrocarbons have lower condensation enthalpy than water, thus, they may reduce the heat exchanger size requirements. They can also reduce the sweep gas impurities in the purified $H_2$ stream since they have low vapor pressure at the condensation temperature. A mixture of hydrocarbons can make the condensation occur in a range of temperatures, and thus, avoid the pinch point limitation occurring with a single and sharp boiling point.

In the present invention heat transfer limitations are overcome by the innovative use of flameless distributed combustion (FDC) as the primary heat source. FDC is used to distribute heat throughout the reactor at high heat fluxes without high temperature flames and with low $NO_x$ production. This is achieved by injecting small quantities of fuel into a preheated air stream and reaching autoignition conditions. Fuel quantity is controlled by nozzle size, the temperature rise is very small, and there is no flame associated with the combustion (combustion is kinetically limited, rather than mass-transfer limited). The reaction in the case where methane is used as the fuel for FDC is:

(R4) Combustion:

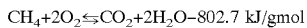

$CH_4 + 2O_2 \leftrightarrows CO_2 + 2H_2O - 802.7$ kJ/gmol

Comparing the enthalpies of reaction (R4) with (R3) above, it is obvious that the minimum amount of methane that needs to be combusted in order to support reaction (3) is 17% of the total methane used (ratio of 1:4.9 to the reformed methane).

Flameless distributed combustion is disclosed in U.S. Pat. Nos. 5,255,742, 5,862,858, 5,899,269, 6,019,172, and WO 99/18392, the disclosures of which are hereby incorporated by reference herein in their entirety.

An important feature of the flameless distributed combustion is that heat is removed along the length of the combustion chamber so that a temperature is maintained that is significantly below what an adiabatic combustion temperature would be. This almost eliminates formation of $NO_x$, and also significantly reduces metallurgical requirements, thus permitting the use of less expensive materials in construction of equipment.

Generally, flameless combustion is accomplished by preheating combustion air and fuel gas (e.g., methane, methanol, hydrogen and the like) sufficiently such that when the two streams are combined the temperature of the mixture exceeds the autoignition temperature of the mixture, but to a temperature less than that which would result in the oxidation upon mixing, being limited by the rate of mixing. Preheating of the combustion air and fuel streams to a temperature between about 1500° F. and about 2300° F. and then mixing the streams in relatively small increments will result in flameless combustion. For some fuels such as methanol, preheating to a temperature above about 1000° F. is sufficient. The increments in which the fuel gas is mixed with the combustion gas stream preferably result in about a 20° to about 200° F. temperature rise in the combustion gas stream due to the combustion of the fuel.

With most steam methane reforming processes controlling the temperature in the catalyst bed is a problem. The advantages of the flameless distributed combustion as a heat source in the present process and apparatus can be summarized as follows:

FDC helps maintain a more uniform temperature, but simultaneously controls heat flux to match the local heat needed for the material left to be reacted. At the highest heat flux there is as much heat present as can be accommodated by the reaction and as the process progresses less and less heat is required to drive the reaction.

FDC has a lower maximum-temperature combustion gas.

FDC does not have hot spots which might damage the hydrogen-selective, hydrogen-permeable membrane.

FDC has a negligible $NO_x$ production.

FDC makes it easier to tailor axial heat flux distribution to minimize entropy production or energy loss and, thus, making it more efficient.

FDC permits a more compact reactor design that is less expensive to build.

FDC permits a modular reactor design, at a wide range of sizes and heat duties.

FDC provides a tapered heat flux profile.

Thus, the flameless distributed combustion (FDC) used to drive the steam reforming reactions in the present invention can be described as comprising:

a) preheating either a fuel gas or oxidant or both to a temperature that exceeds the autoignition temperature of the fuel gas and oxidant when they are mixed;

b) passing said fuel gas and oxidant into a heating zone which is in heat transferring contact along a substantial portion of the reaction zone (i.e., the zone in which said reforming reactions take place); and c) mixing the fuel gas and oxidant in said heating zone in a manner that autoignition occurs, resulting in combustion without high temperature flames, thereby providing uniform, controllable heat over a substantial portion of said heating zone which is in contact with said reaction zone.

In the practice of the invention, some degree of sulfur removal will probably be necessary to protect the palladium material making up the hydrogen permeable separation membrane and the Ni reforming catalyst. Sulfur is a temporary poison to such catalysts, but the catalyst activity can be regenerated by removing the source of sulfur. The sulfur tolerance of commercial catalysts is dependent upon process conditions. On average, sulfur must be reduced to below 10 ppb to allow the catalyst to function properly.

Feed clean up with ZnO beds or by other means known in the art may be used to remove impurities such as $H_2S$ and other sulfur containing compounds in the feed that could contribute to membrane degradation. For heavier hydrocarbons, like naphtha, some hydrotreating may be necessary to convert organic sulfur to $H_2S$, as known in the art. Heavy oil, solids carried by liquid water, oxygen, amines, halides, and ammonia are also known poisons for palladium membranes. Carbon monoxide competes with hydrogen for active surface sites, thus reducing the hydrogen permeability by 10% at 3–5 Bar. Thus, the partial pressure needs to stay low for best performance, as is the case in our preferred design.

In another embodiment of the present invention the FDC-MSR generated pure hydrogen is used in an integrated design to power a fuel cell. This embodiment of the present invention has the potential for 71% or greater efficiency in the generation of electricity from starting fuel. In addition, due to the unique integration of the system, $CO_2$ is produced in high concentrations and is easier to separate from nitrogen, which makes the system even more efficient.

Figure 6:
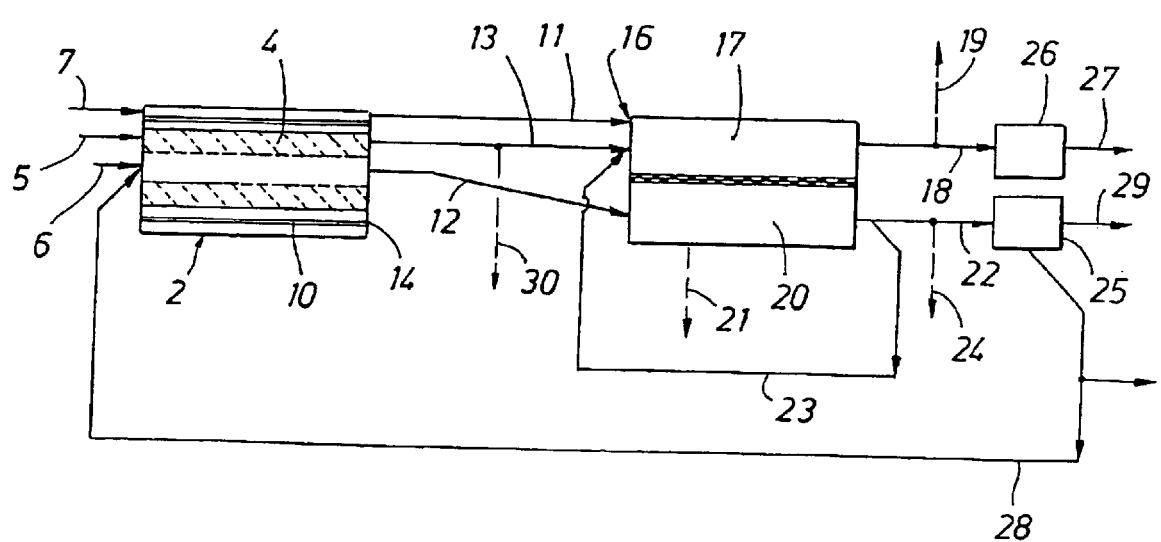
FIG. 6 is a simplified flow diagram of the zero emission flameless distributed combustion-membrane steam reformer fuel hybrid power system.

Referring now to FIG. 6, a vaporizable hydrocarbon and steam 5 are fed into the catalyst section 4 of a FDC-membrane reactor of the type described in FIG. 1, while preheated air 7 and fuel 14 are fed into the FDC heating section 2 of the reactor containing fuel tubes 10. A sweep gas (in this case steam) is fed into the FDC-membrane reactor at 6. The produced high purity hydrogen stream, 12, is directed to the anode compartment of the molten carbonate fuel cell, 20, operating at about 650° C. and 5 Bar. The reactor effluent 13 containing the unreacted steam, $CO_2$ and low quantities of methane, hydrogen and CO, and the flue gas 11 from the FDC heater and air, 16 are fed to the cathode compartment of the same fuel cell, 17. The $CO_2$ reacts with the $O_2$ to form $CO_3^=$ anions that transport through the molten carbonate membrane. The $CO_3^=$ anions are constantly renewed. The reactions with indicated transport are described as follows:

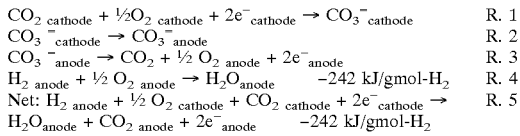

| | |
|---|---|
| $CO_{2\ cathode} + \frac{1}{2}O_{2\ cathode} + 2e^-_{cathode} \rightarrow CO_3^=_{cathode}$ | R. 1 |
| $CO_3^=_{cathode} \rightarrow CO_3^=_{anode}$ | R. 2 |
| $CO_3^=_{anode} \rightarrow CO_2 + \frac{1}{2}O_{2\ anode} + 2e^-_{anode}$ | R. 3 |
| $H_{2\ anode} + \frac{1}{2}O_{2\ anode} \rightarrow H_2O_{anode}$   −242 kJ/gmol-$H_2$ | R. 4 |
| Net: $H_{2\ anode} + \frac{1}{2}O_{2\ cathode} + CO_{2\ cathode} + 2e^-_{cathode} \rightarrow H_2O_{anode} + CO_{2\ anode} + 2e^-_{anode}$   −242 kJ/gmol-$H_2$ | R. 5 |

Electricity generated by the fuel cell is shown as electrical output 21. The stream from the anode, 22, now contains the permeated $CO_2$ and steam but no hydrogen, nitrogen, methane or oxygen, if hydrogen and oxygen are fed in exactly 2:1 stoichiometry. A portion of stream 22 may recycled to the cathode compartment 17 of the fuel cell. The $CO_2$ recycle stream is shown as 23 on FIG. 6. A portion of streams 22 and/or 13 may also be put through a turbine expander to generate electrical or mechanical work 30 and 24, respectively. Currently industry and governments are spending enormous amounts of money in search of practical and economical methods for separating $CO_2$ from turbine and other combustion exhaust streams. In the present invention $CO_2$ is separated from nitrogen essentially for free while electricity is simultaneously generated. Furthermore the $CO_2$ capture leverage is high. As shown above, each mole of methane is converted to 4 moles of $H_2$. Therefore 4 moles of $CO_2$ per mole of converted methane are required to transport the oxygen in the fuel cell and are therefore separated from the nitrogen. Thus, this process can also be used to separate $CO_2$ from an external $CO_2$-containing stream. The high concentration $CO_2$ stream, 29, is now a prime candidate for sequestration after the steam is condensed. The $CO_2$ can be used for oil recovery, or injected into subterranean formations, or converted to a thermodynamically stable solid. Also, since the present process can operated to produce high purity hydrogen and nitrogen as well as concentrated $CO_2$, it can be used to facilitate the production of chemicals such as urea, which can be made from these three raw materials. Other chemicals which can be manufactured using the products and by-products of the present process include ammomia and ammonium sulfate. Other uses for the concentrated stream of $CO_2$ and the high purity hydrogen and nitrogen streams produced by the present process will be apparent to those skilled in the art.

The stream from the cathode, stream 18, contains all the nitrogen, unreacted oxygen, a little unpermeated $CO_2$, and trace amounts of the methane, hydrogen and CO from the MSR effluent. All or part of this stream can be put through a turbine expander (not shown) to generate work (electrical or mechanical ), 19. The trace components of stream 18 may be oxidized in a catalytic converter, 26, and emitted in the atmosphere as a low $CO_2$ concentration containing stream 27, containing less than 10% $CO_2$, preferably less than 1% $CO_2$. The trace components may also be oxidized inside the fuel cell if the appropriate catalyst is placed in the cathode compartment. A stream, 28, containing water and steam exits condenser 25 and is recycled to the FDC-MSR reactor, and reheated to between about 250 to 500°.

The zero emission hybrid system of the present invention is extremely efficient. By-product compounds are separated, the steam and hydrogen are reheated efficiently, and electricity is produced. Furthermore, water is separated from purified $CO_2$ which is produced in concentrations large enough to be easily sequestered. Advantages include using waste heat to raise steam and using water collected for recycling to support additional steam reforming or other beneficial uses. The system is a totally integrated, extremely efficient design having the potential for greater than 71% generation efficiency as mentioned above. The 71% is approximately a 20% fractional improvement over the best results we aware of in the art, the 60% figure mentioned above that is possible under laboratory conditions. In addition to the great improvement in efficiency, the integrated design provides a concentrated source of $CO_2$ for capture and sequestration as well.

Fuel cells which would be suitable for use in the present invention are those that could function in a highly pressurized system. Most fuel cells run at atmospheric conditions. For this reason, a high pressure molten carbonate fuel cell is preferred. However, other types of fuel cells, such as PEM fuel cells and SOFC, can also be effectively combined with the FDC-MSR reactor of the present invention.

Another very attractive feature is that the FDC powered MSR hydrogen generator produces very low $NO_x$, especially compared with the combined processes known in the art. Due to the use of flameless distributed combustion very little $NO_x$ is generated in this system. Furthermore, other steam reforming reactors used to generate hydrogen known in the art could not feed to the MCFC the flue gas from the furnace as in the present design, because they produce high $NO_x$, which would poison the molten carbonate membrane.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLE 1

A simulated reaction was carried out to demonstrate the FDC powered steam reformer of this invention. The simulated reactor, as generally described in FIG. 1, consisted specifically of 20 tubes of 12.19 m length and two concentric sections, 0.14 m OD on the outside and 0.096 m OD on the inside section. The catalyst was a 30% w $Ni/Al_2O_3$ loaded in the annulus between the two sections (typical reforming catalysts available from manufacturers like Engelhard, Sud-Chemie, ICI, Haldor-Topsoe, etc.). The membrane was placed on the inside of the small section. The FDC heater tubes are placed in a circular pattern on the outside of the large section while the air flows in the annular region surrounding the tubes. The permeate section was purged with steam at a flow rate equal to that of the steam feed of the catalyst section and kept at 1 Bara pressure. The simulation was run at a space velocity of 6600 $h^{-1}$ or 656 std-$m^3$/h/tube (at 0° C., 1 Atm) and at a feed steam-to-methane ratio of 3:1. Some hydrogen was allowed in the feed (0.5% m) to avoid the singularity of the rate expressions that have the hydrogen partial pressure as a division factor. The heater side is assumed to be at a uniform temperature of 500° C. An optimistically high "U" (overall heat transfer coefficient) of 7400 W/$m^2$K was assumed in this example, to exemplify the magnitude of the benefit of the membrane when the heat transfer rate is not limiting and to give an isothermal reactor temperature profile. The actual value of U should be in the order of 300–700 W/$m^2$K for ordinary furnaces (higher for FDC heaters), but even then, the model predicts the methane conversion to be 84% if the heater is at uniform 500° C. temperature. This low heater temperature is not necessary. The manipulation of the heater temperature to greater than 500° C. to tailor the heat flux profile at lower U will yield similar benefits with those of U equal to 7400 W/$m^2$K. This is one of the advantages of the FDC heaters. The FDC heaters can also be designed to allow the materials of the reactor to operate below a maximum design temperature, which in this case could be below 600° C. This temperature limit is by 300–400° C. lower than the limit used for a conventional steam reforming reactor and it allows the use of less expensive materials of construction (like stainless steel). This constitutes considerable savings in the construction and maintenance cost of a steam-reforming reactor.

The design of the FDC powered MSR reactor of the present invention also reduces the number of unit operations needed to produce hydrogen. The traditional high-temperature and low-temperature shift reactors and the methanation reactor are not needed anymore. The $CO_2$ removal and water removal steps are not necessary either to produce hydrogen nearly free of impurities. This process design using a MSR is a process-intensified design, with reduced volume, plot space, operator supervision construction costs, and cheaper materials. Even the cost of the Pd layer is relatively small at the preferred thickness of about 1 micron. Fabrication of the Pd layer may be a significant part of the reactor cost, but all other savings would outweigh it.

A membrane reactor simulation code was written to integrate the set of reaction rate expressions for reactions R1–R3 above, together with the heat balances and mass balance for the permeated hydrogen. A linear pressure drop was assumed for simplicity. The reaction kinetics were taken from the literature and used in the Langmuir-Hinselwood rate form. See Xu, J., G. F. Froment, "Methane Steam Reforming, Methanation and Water-Gas Shift: I. Intrinsic Kinetics", AIChE Journal, Vol. 35, No. 1, January 1989, pp 88–96; Xu, J., and G. F. Froment, "Methane Steam Reforming, Methanation and Water-Gas Shift: II. Diffusional Limitations and Reactor Simulation", AIChE Journal, Vol. 35, No. 1, January 1989, pp 97–103; and de Deken, J., et. al., Steam Reforming of Natural Gas: Intrinsic Kinetics, Diffusional Influences and Reactor Design, Chem. React. Eng., ACS Symp. Ser., 196, Boston, 1982.

A uniform effectiveness factor of 50% was used for all reactions compared to the reported kinetics with no diffusion limitations. However, a credit factor of 2 times was applied to correct the rate expressions for the 30% w Ni in the assumed catalyst vs. the 15% w Ni used in the kinetic experiments of Xu. A Runge-Kutta fourth order integration algorithm with a variable integration step was used.

The critical parameter in the simulation results is the value of the membrane permeability. This is calculated according to Richardson's or Sievert's law:

$$D = a\frac{A}{t}(p_1^{0.5} - p_2^{0.5})\exp\left(-\frac{b}{RT}\right)$$

where:

D is the hydrogen permeation rate in std-$m^3$/s

A is the membrane effective surface area in $m^2$ $P_1$, $P_2$ are the reactor and permeate partial pressures of hydrogen in Bara t is the thickness of the membrane in m T is the membrane temperature in K R is the ideal gas constant in J/kmol/K a, b are empirical constants dependent on the material of the membrane Thus, the factor $a/t * \exp(-b/RT)$ is considered to describe the permeability in std-$m^3/m^2/s/Bar^{0.5}$ and shows the sole dependence on the material composition and the temperature. The equation above indicates that the rate-limiting step in the transport of hydrogen across the Pd film is the atomic diffusion in the solid.

The hydrogen separation membrane in our simulations is a Pd-alloy (Ag, Ta, V, etc.) thin film of 1 $\mu$m with a high surface area exposed to the reactor side. The Pd-alloy film is supported on a porous ceramic matrix that acts as the mechanical support, filtration medium to prevent coke from covering the film, and an insulator to reduce heat losses from the reactor. It also keeps the membrane at the specified temperature for optimum performance and stability. This special design geometry is highly efficient. The permeability used for the base case is 7.8 $10^{-2}$ std-$m^3/m^2/s/Bar^{0.5}$.

Results of such a simulation for our base case are shown in Table 3. As seen from the simulation results methane reaches 98% conversion and only 0.95% of that reacted amount was converted to CO. The hydrogen that permeated the membrane is 99% of the total made. The outlet gas flow rate is 347 std-m3/h per tube or 53% of the inlet flow rate. The estimated pressure drop is 2.4 Bar using the Ergun equation, with hollow-cylinder catalyst pellets of one inch "mean particle diameter" (as defined by the ratio of $6/\alpha_v$ where $\alpha_v$ represents the specific surface of the particle) and a 42% bed porosity. The use of hollow cylinders has the purpose of achieving lower pressure drop and reduced diffusional limitations. The exit stream contains 51%m steam, 45% $CO_2$, 3% $H_2$ and 1% $CH_4$ and 0.4% CO, or in dry-basis 92% $CO_2$, 5.5% $H_2$, 1.8% $CH_4$ and 0.9% CO. The permeate stream contains 56% $H_2$ with partial pressure of 0.56 Bara while the reactor effluent $H_2$ is at 0.75 Bara. The reaction enthalpy needed per tube is 325 kW. Total hydrogen make is 27 metric tons/day with 99% collected on the permeate side of the membrane. Results are reported in Table 3:

TABLE 3

SMR CATALYST KINETIC/DEACTIVATION MODEL

| PROCESS CONDITIONS | | PERFORMANCE PREDICTIONS | | REACTOR/ CATALYST | | outlet |
|---|---|---|---|---|---|---|
| Heater top T, ° C. | 500.0 | CO Selectivity | 0.95% | Tube Flow Rate, N 1/h | 656256 | 347345 |
| GHSV, 1/hr | 6600 | Methane Conversion | 98.04% | Tube Height, m | 12.19 | H2 permeation, NL/h |
| Pressure (inlet) Bara | 30 | $H_2$ Work Rate, Kg/m³/h | 566.77 | Tube I. D., cm | 14.00 | 625459 |
| | | Total $H_2$ make, MT/day | 27.05 | Total Volume, m³ | 1.989 | |
| | | Tube heat Consumption, KW | 324.97 | Total catal. mass, kg. | 1712 | |

| | INLET GAS COMPOSITION | INLET GAS FLOW (N 1/h) | | OUTLET GAS COMPOSITION | OUTLET GAS FLOW (N 1/h) | No. of Tubes | 20 |
|---|---|---|---|---|---|---|---|
| Water, % m | 74.90 | 491536 | Water | 50.81 | 176490 | Heating Intensity | High |
| Methane, % m | 24.60 | 161439 | Methane | 0.91 | 3165 | Heat x-coeff. W/m²/K | 7369 |
| Carbon Dioxide, % m | 0.00 | 0 | Carbon Dioxide | 45.13 | 156772 | Model Used | Ni/Mg $Al_2O_4$\ (Xu) |
| Hydrogen, % m | 0.50 | 3281 | Hydrogen | 2.71 | 9415 | | |
| Carbon Monoxide, % m | 0.00 | 0 | Carbon Monoxide | 0.43 | 1502 | | |
| Nitrogen, % m | 0.00 | 0 | Nitrogen | 0.00 | 0 | Heater T rise, ° C. | 0.0 |
| Propane, % m | 0.00 | 0 | Propane | 0.00 | 0 | Integration steps | 2475 |
| Argon, % m | 0.00 | 0 | Argon | 0.00 | 0 | Radiation heat, kW | 0.0 |
| Ethane, % m | 0.00 | 0 | Ethane | 0.00 | 0 | Heater area, m² | 5.58 |
| Total | 100.00% | 656256 | Total | 100.00% | 347345 | Membrane O.D., cm | 9.6 |
| MW, g/mol | 17.4 | | MW, g/mol | 29.3 | Average temperature, C. | Membrane area, m² | 3.68 |
| Reactor feet T, ° C. | 500.0 | | Reactor outlet T, ° C. | 499.4 | 496.3 | Permeability, m/s/Bar$^{0.5}$ | 7.77 E-02 | H2 recovery |
| Water rate, mol/(g-cat.h) | −223.204 | | Water rate, mol/(g-cat.h) | 0.097 | | Sweep gas flow, N 1/h (steam) | 491536 | 99.0% |
| CO rate, Mol/g-cat.h) | 5.435 | | CO rate, Mol/g-cat.h) | 0.40 | | Permeate pressure, bar | 1.000 |

TABLE 3-continued

SMR CATALYST KINETIC/DEACTIVATION MODEL

| | | | | | |
|---|---|---|---|---|---|
| Pressure Drop, Bar | 2.4 | Pressure (outlet), bara | 27.6 | Init. Permeation, N 1/h/n | 326653 |
| | | | | Pd thickness, μm | 1 |
| | | | | Pd weight, kg | 6.6186 |

Figure 3:
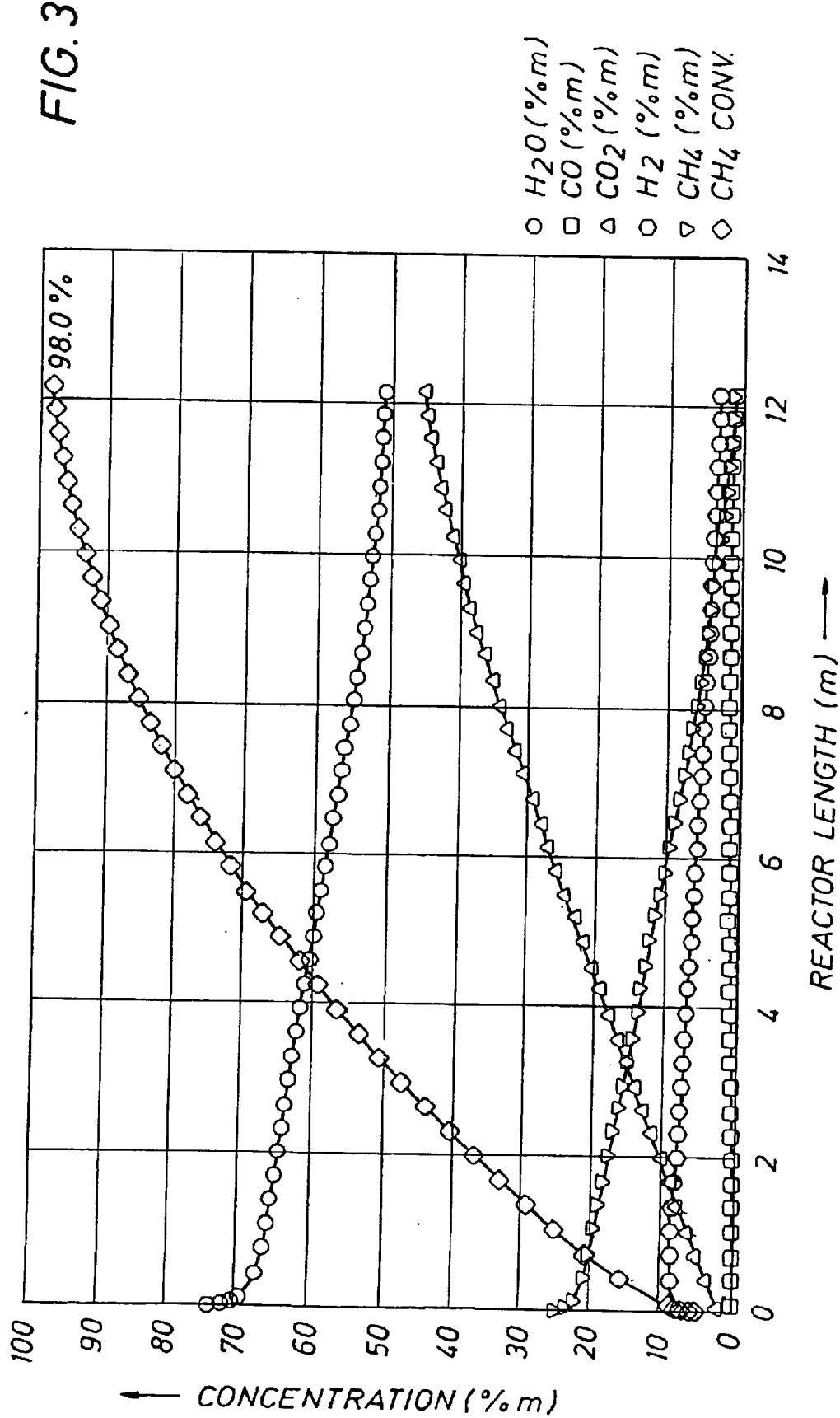
FIG. 3 is a graph showing molar fraction and methane conversion along the reactor.

FIG. 3 shows the evolution of molar fractions and methane conversion along the catalyst bed. It is clear that significant conversion is attained at the entrance to the reactor, until the equilibrium is reached. Subsequently hydrogen permeation drives the reaction. This indicates that the kinetics is fast and that the membrane flux is the rate-limiting process.

Figure 4:
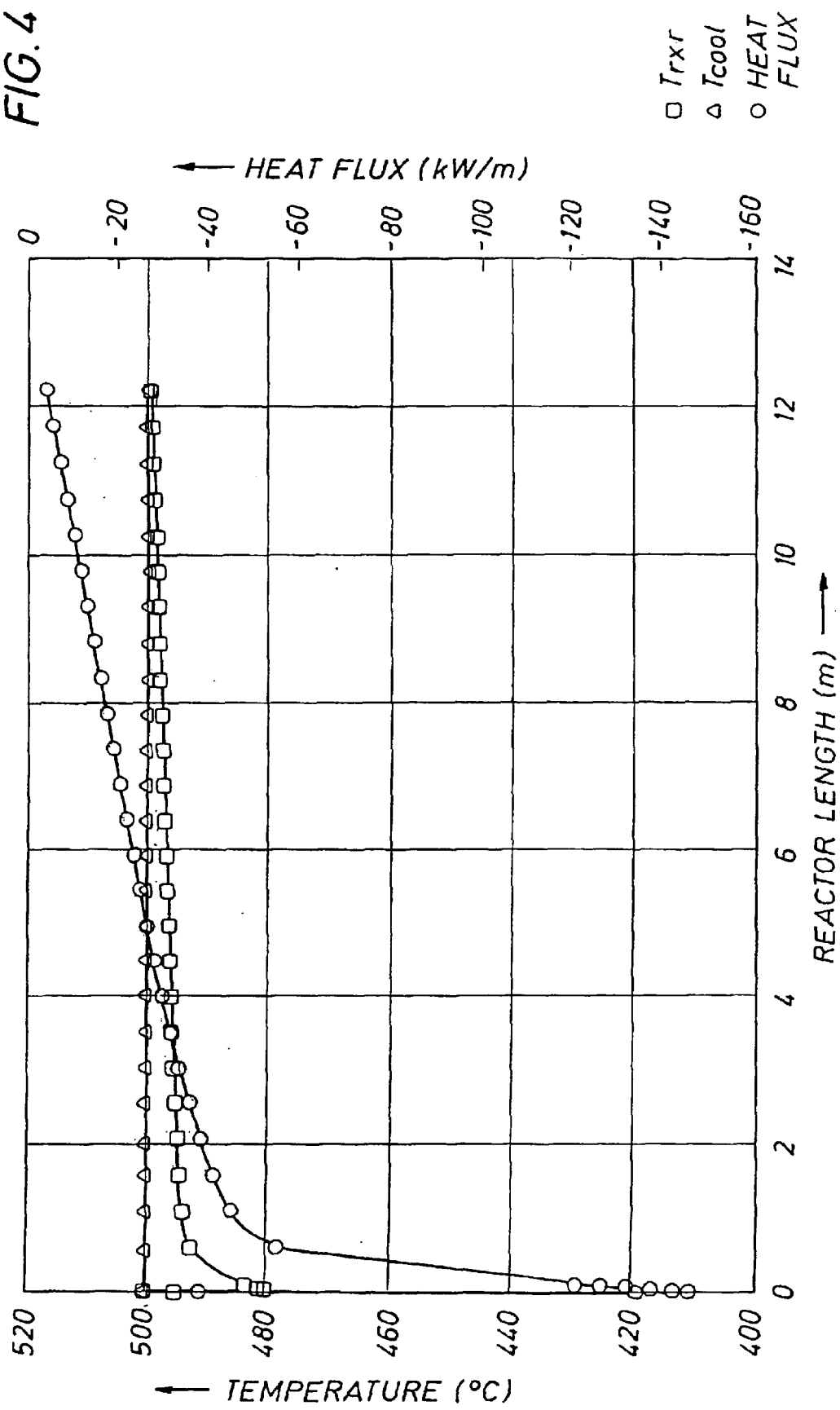
FIG. 4 is a graph showing temperature and heat flux per length profile along the reactor.

FIG. 4 shows the evolution of temperature and heat flux along the reactor. Clearly, for a nearly isothermal reactor a very high heat flux of $-150$ kW/m (or $-340$ kW/m$^2$) is needed at the entrance, but with a very low heat flux of $-4$ kW/m (or $-9$ kW/m$^2$) required at the exit. The FDC heater is an ideal means for tailoring that heat flux, far better than that achievable in a conventional furnace.

Figure 5:
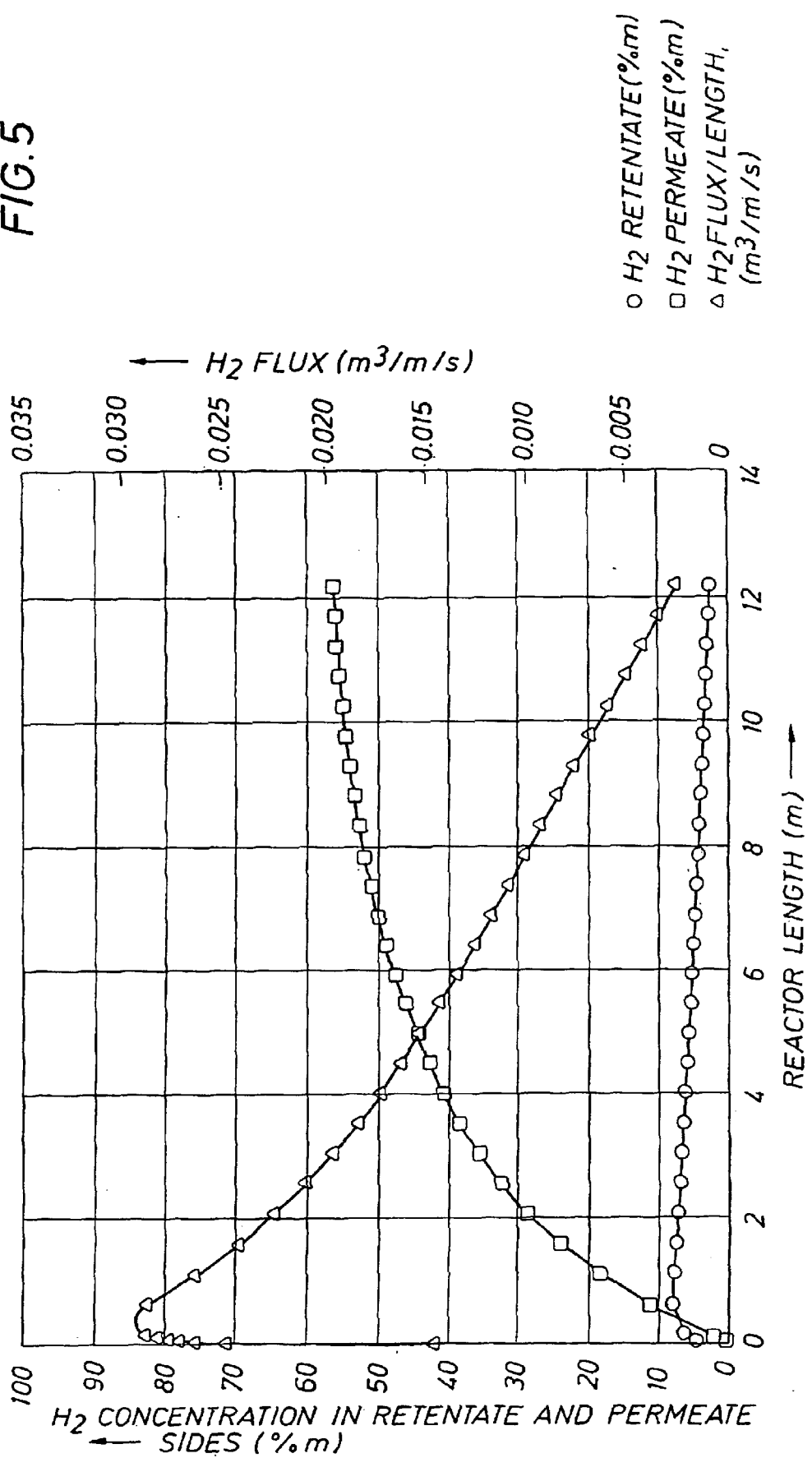
FIG. 5 is a graph showing hydrogen molar fraction profile and membrane volumetric flux per length (in $m^3/m/s$) along the reactor.

FIG. 5 shows the evolution of the hydrogen molar fraction at the catalyst and permeate sides and the volumetric flux across the membrane. It appears that there is a monotonic decline in the flux and the tail of the reactor experiences the lowest pressure differential and the lowest flux. In another embodiment one could run the permeate side at lower pressure, for example, 0.5 Bara, which is achievable with a blower. Alternatively, a counter-current sweep is possible to maximize the use of the driving force between the reactor and permeate sides.

EXAMPLE 2

Figure 7A:
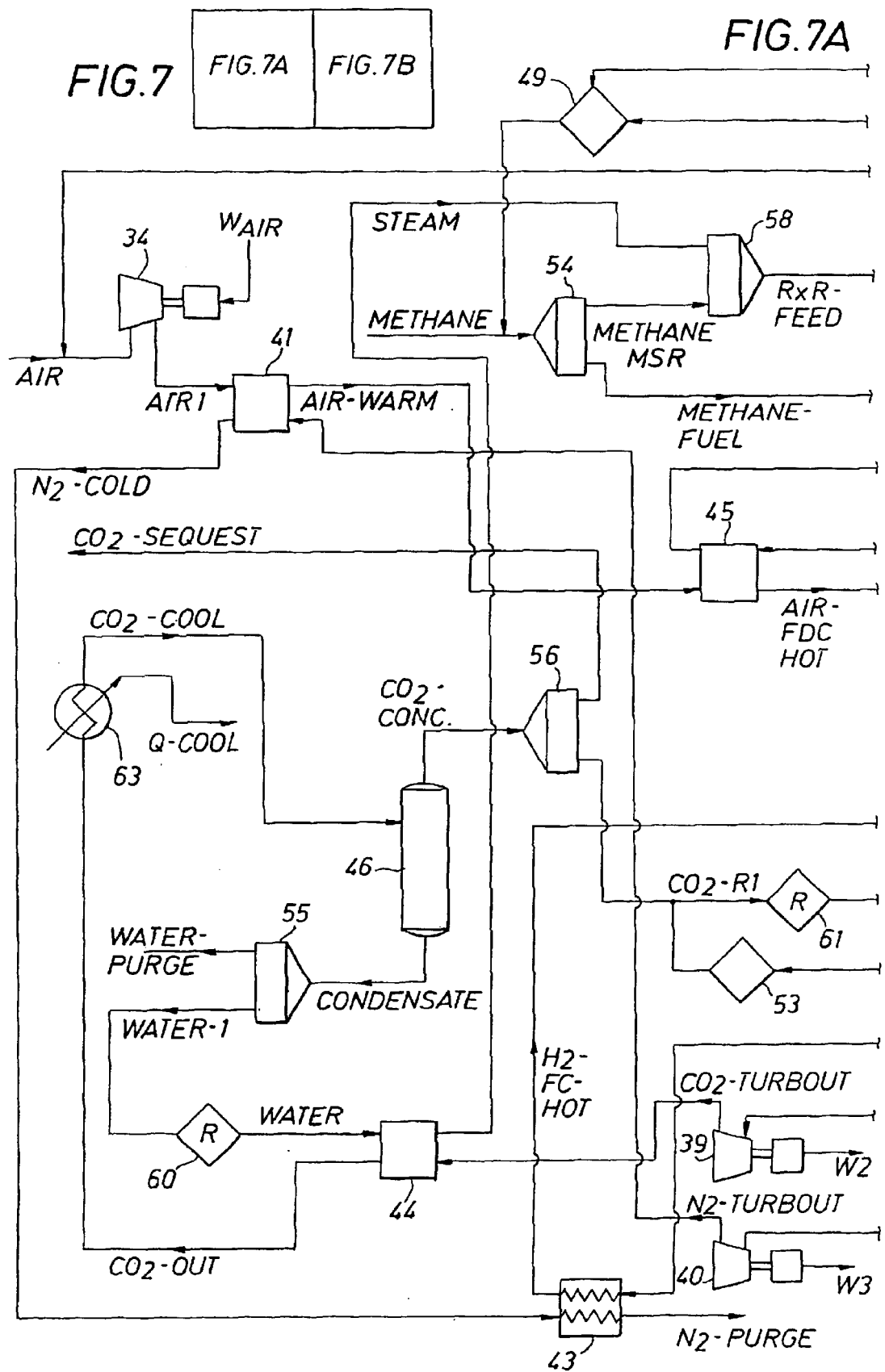
FIGS. 7A&B is a process flow diagram of the zero emission process as simulated in a HYSYS process simulator.
Figure 7B:
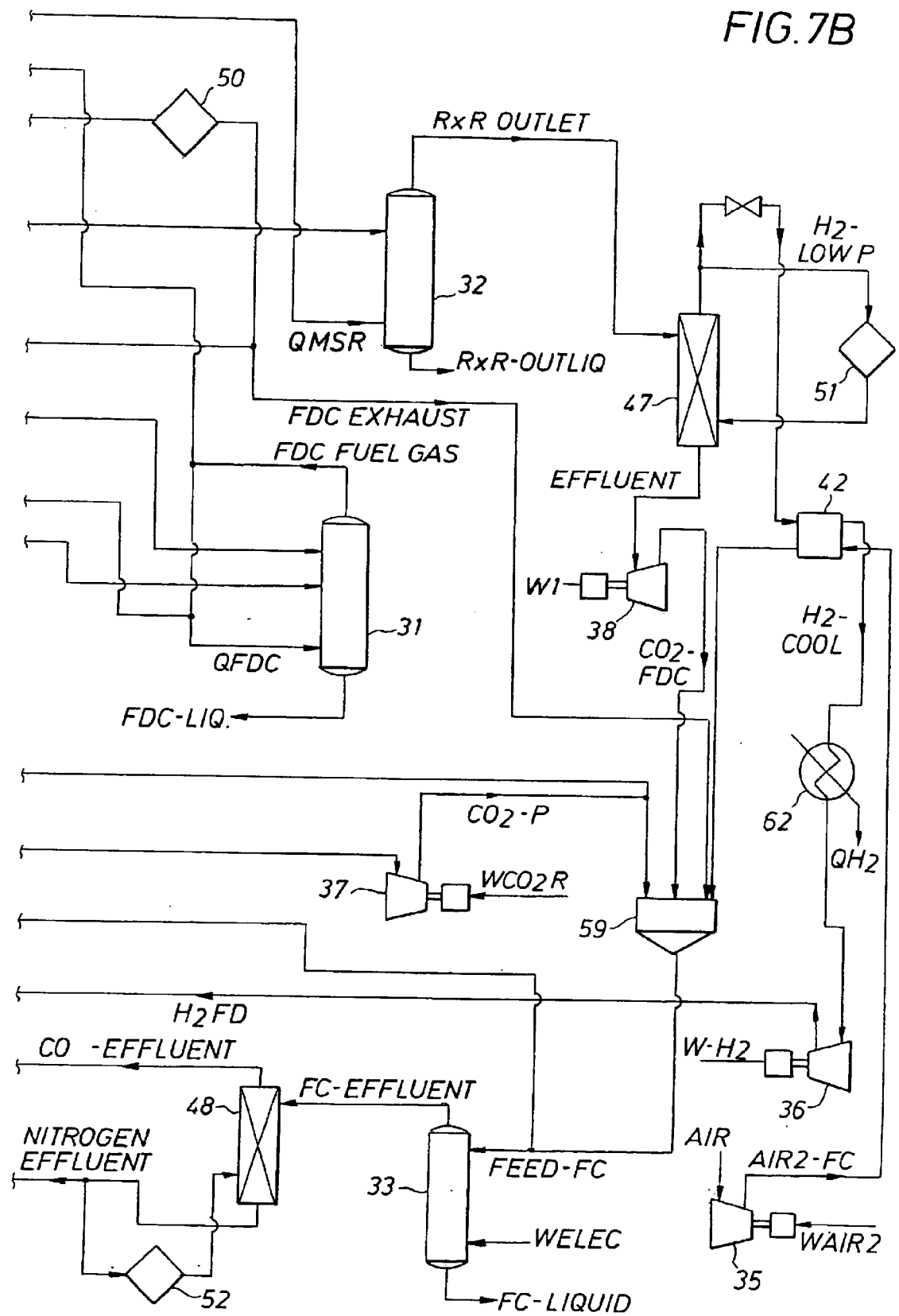

A simulation of the zero emission hybrid power generating process was carried out in Example 2. The set of mass and heat balances for the process was obtained using the HYSYS process simulation software offered by AEA. Referring to The Process Flow Diagram in FIGS. 7A&B, the process contains the following HYSYS unit operations:

1. A Gibbs Reactor, FDC-Burner, 31, to combust methane with air and provide enthalpy for the MSR reactor (Reaction 4).
2. A Conversion Reactor, MSR-Reactor, 32, for the MSR reactor to effect the given methane conversion and $CO_2$ selectivity that was calculated off-line from the Ex-cel/Visual Basic model (reactions R1–R3).
3. A Conversion Reactor, Fuel Cell, 33, for the fuel cell to react the hydrogen and oxygen to water and electricity (Reaction 9).
4. Four compressors, 34, 35, 36 and 37, to feed air to the FDC and the fuel cell, low pressure hydrogen to the fuel cell, and to recycle $CO_2$ to the fuel cell, requiring energy input of $W_{air}$, $W_{air2}$, $W_{H2}$, and $W_{CO2R}$. The assumed compressor polytropic efficiency is 80% and it is accounted for by the simulator. Note that two compressors have exit temperatures of 242° and 248° C. Those values are essentially the upper temperature limit of ordinary compressors. Feed methane is supplied at 30 Bar and 200° C. (pipeline supply) via coupling 54 which splits the methane into two streams. One methane stream serves as feed to the FDC burner, 31, while the second methane stream passes through mixer 58 to MSR reactor 32. The steam to the MSR reactor is prepared by heating the recycled condensate to the 30 Bar saturation temperature of steam at 234.1° C. A pump is needed to compress the water to 30 Bara, but it's not considered here, since that power is negligible compared to the power to compress a compressible gas.
5. Three turbines, 38, 39 and 40, are used in order to achieve maximum energy efficiency by recovering mechanical work ($W_1$, $W_2$, $W_3$) from high pressure and temperature streams. These streams are the MSR reactor effluent, and the fuel anode and air cathode effluents. The assumed turbine adiabatic efficiency is 90% and it is accounted for by the simulator.
6. Five heat exchangers (interchangers) are used to recover thermal energy from the high temperature streams and used to preheat the low temperature streams. Interchangers 41, 42 and 45 preheat the two air streams, while interchanger 43 preheats the hydrogen feed to the fuel cell, and boiler 44 the water feed to the MSR. The the MSR. The latter is heated to saturation temperature at the given pressure.
7. One separator, 46, acts as a knock-out pot, to collect the condensed water from the fuel cell anode effluent stream and to isolate the relatively pure $CO_2$ for sequestration.
8. The two splitters, 47 and, 48, are a HYSYS method to separate streams in a user-specified ratio to accommodate for the fact that these streams are separate in reality, but they have to enter the HYSYS reactors in a mixed state.
9. Five adjustment loops, 49, 50, 51, 52, and 53, insure that the components are apportioned correctly with each stream and that appropriate amounts of methane and air are fed to achieve the right oxygen to fuel ratio and to achieve equal heat flow in the MSR and FDC.

The energy produced in the fuel cell ($W_{elec}$) is considered equal to the electrical power that it makes. The energy that is recovered from the turbines minus the work required by the compressors (net positive) is added to $W_{elec}$ to give the total energy gain of the process. If we divide that number by the methane feed rate times its lower heating value, or ca. 50,000 kJ/kg, the energy efficiency is obtained:

Efficiency=(Welec+$W_1$+$W_2$+$W_3$–Wair–Wair$_2$–WH$_2$–WCO$_2$R)/[$_m$(CH$_4$)*D$_H$]=(1378+35.1+195.7+219.4–43.84–128.2–73.67–37.81)/(154.5/3600 kg/s *50 10$^3$ kJ/kg)=71% energy efficiency In the absence of the three energy recovery turbines, the energy efficiency is at least 51%.

Again referring to FIGS. 7A&B, the process has a condensate stream from separator 46 which is split at coupling 55 into a water effluent stream, Water-purge, and a second water stream which is recycled through 60 to boiler 44, then to mixer 58 and then to MSR Reactor 32. The hydrogen feed to the fuel cell passes through interchanger 42 and exchanger 62 compressor 36, interchanger 43, mixer 59, to fuel cell 33. The process also has a concentrated $CO_2$ stream which passes through exchanger 63, separator 46 and coupling 56, which splits the $CO_2$ stream into recycle stream which is recycled via 61 to compressor 37 and mixer 59 to fuel cell 33. The effluent stream, $CO_2$-sequest, split by coupling 56, is very concentrated in $CO_2$ (98.2% w, with the balance being water) which is compressed and can be injected for oil recovery, or used in any other form of $CO_2$ sequestration, or used in industrial synthesis, or injected into deep wells. The other effluent stream, $N_2$-purge, contains primarily nitrogen and is exhausted after being passed through a catalytic oxidizer, (not shown here) to remove traces of unspent fuel components (approximately, 0.64% m CO, 0.33% $H_2$, and 0.17% methane.) This stream could be a valuable source of industrial-grade nitrogen, or used for enhanced-oil recovery or used in other applications apparent to those skilled in the art. Finally, a water effluent stream, Water_purge, is used to remove excess water formed in the system, and to eliminate build-up of trace impurities in the water recycle loop.

The material and energy efficiency advantage of the process in example 2 is due to the tight material and energy integration between the Membrane Steam Reforming reactor (MSR) and the Molten Carbonate Fuel Cell (MCFC). The integration is exhibited in:

1. Feeding carbon dioxide made in the FDC heater and the MSR to the MCFC.
2. Recycling the water used as MSR sweep gas plus that made in the MCFC, back to the MSR feed, thus, reducing water emissions to a minimum purge stream, and obviating the need of a fresh water supply.
3. Using the pressure and temperature of specific outlet streams to generate electricity in turbines, instead of it becoming waste heat.
4. Using the enthalpy of specific outlet streams to exchange heat with given inlet streams for reduction in net fuel usage.

This arrangement of MSR and MCFC is also advantageous in terms of transportation flexibility. Normally, natural gas produced in a remote well will require the infrastructure of a LNG plant for transportation in liquid form or a natural gas pipeline. An additional option is introduced, which is that of electricity transportation to nearby residential or commercial markets. That may become more economical in specific instances.

The unique fit of the MSR for use in electricity generation using MCFC is that the MSR generates very low amounts of $NO_x$ emissions. This is beneficial first for environmental reasons, as the purge nitrogen has low $NO_x$. Moreover, the MCFC is uniquely sensitive to $NO_x$ impurities and it would not operate with conventional furnace flue gas.

Finally, an additional unique characteristic of the MSR is that can be modular and adjustable to whatever MCFC capacities are available. Any arbitrary number of MSR membrane tubes can be easily designed and constructed since each one is running independently of the others and no increase in tube diameter is needed. The FDC heating is easily scalable for someone skilled in the art. As the art of MCFC progresses to larger scales and capacities, the MSR can follow this capacity without any additional research and scale-up risk. Some MCFC's have internal reforming and, thus, can use hydrocarbons as the feed fuel. However, this system has distinct advantages compared to the former. It has increased fuel processing efficiency, higher carbon dioxide partial pressure for higher current density, it can isolate the hydrogen as an intermediate, and it has the ability to capture the $CO_2$ and the nitrogen in separate streams.

For application in Proton Exchange Membrane (PEM) fuel cells, the MSR reactor of the present invention, if operated in stand-alone mode, provides the source of high purity hydrogen that is needed by PEM's for high current density and high catalyst longevity. The hydrogen from MSR can contain virtually no CO, and it can easily achieve less that 10 ppm CO, which is the maximum tolerable by PEM Fuel Cells. If small pinhole leaks develop in the membrane, then a small catalyst bed packed inside the permeate section can eliminate the CO that leaked by converting it, in the presence of excess steam, back to methane. This methanation reaction is practiced commercially in separate reactors, but it can be done here inside the permeate tube due to the low required reaction rates, and at a very marginal hydrocarbon yield loss. Methane is not harmful to PEM fuel cells.

Moreover, the availability of distributed hydrogen in remote locations where natural gas and oil are produced together (Associated Gas) allows the opportunity to capture the value of the natural gas by converting it to hydrogen. The hydrogen can be used to remotely hydroprocess the oil with technology commonly known to refining experts. The value of the oil is increased, the amount of sulfur, nitrogen, metals and the viscosity drop, making the oil cleaner, more easily processed by refineries and more transportable.

When MSR is run in stand-alone mode, a pure nitrogen stream can be made, if part of the produced hydrogen is used as the feed fuel to the FDC heaters. The flue gas from the FDC will contain only nitrogen and steam, if a 2:1 stoichiometric ratio of hydrogen and oxygen is used. For every mole of hydrogen consumed in FDC, 1.88 moles of pure nitrogen are made. The value of 1.88 moles of nitrogen historically equals or exceeds the value of 1 mole of hydrogen. The concept of hydrogen as an FDC fuel, not only creates extra value from hydrogen, but also eliminates the cost of natural gas that had to be used as a fuel, and eliminates any CO2 emissions from FDC.

EXAMPLE 3

A palladium-on-tantalum membrane having a palladium thickness of about 5–10 microns, a tantalum thickness of 70–120 microns and a porous surface area of ca. 20 $cm^2$, closed at one end, was encased in a half inch diameter stainless steel tube, and the void space filled with ca. 20 gm of bulk-metal nickel catalyst having a Ni content of ca. 45% as a 25/40 mesh powder. The unit was swept with nitrogen and the catalyst sample pretreated with hydrogen at 420° C. With steam flowing through the unit under 80 psig back pressure, the temperature was raised to 500° C. and a full vacuum drawn on the permeate side of the membrane. A combination of methane (3.0 sl/hr, 0.13 mole/hr) and steam (22 gm/hr, 1.22 mole/hr) were then fed to said unit and under steady state conditions the product and permeate gases were analyzed.

A gas chromatography (GC) analysis of the product gases showed:

82% methane conversion per pass

98% permeation of the product hydrogen through the membrane

74% concentration of carbon dioxide in the product effluent A mass spec analysis of the permeate gas showed:

>95% purity hydrogen

EXAMPLE 4

A palladium-on-porous stainless steel membrane one half inch in diameter, having a palladium thickness of 20–30 microns and a surface area of about 50 cm², was encased in a one inch diameter stainless steel tube and the void space filled with 52 gm of bulk-metal nickel catalyst having a Ni content of ca. 45%, as a 25/40 mesh powder. The unit was swept with nitrogen and the catalyst pretreated with hydrogen at 420° C. With steam flowing through said unit under 75 psig back-pressure, the temperature was raised to 500° C. and a full vacuum drawn on the permeate side of the membrane. A combination of methane (3.0 sl/hr, 0.13 mole/hr) and steam (ca. 30 gm/hr) were then fed to said unit under steady state conditions and the product gases were analyzed.

GC analyses of the product gas typically showed:

93% methane conversion per pass

95% hydrogen permeation of the membrane

73% concentration of $CO_2$ in the product gas

EXAMPLE 5

A palladium-on-porous stainless steel membrane one half inch in diameter having a palladium thickness of 20–30 microns and a surface area of ca. 50 cm², closed at one end, was enclosed in a one inch diameter stainless steel tube, and the void space filled with 52 gm of bulk-metal nickel catalyst having a Ni content of ca. 45%. The unit was swept with nitrogen and the catalyst pretreated with hydrogen at 420° C. With steam flowing through the unit under 80 psig, the temperature was raised to 500° C. and a full vacuum drawn on the permeate side of the membrane. A mix of methane (3.0 sl/hr, 0.13 mole/hr) and steam (27 gm/hr, 1.5 mole/hr) was then fed to the unit and under steady state conditions the product gas mix showed:

99% methane conversion per pass

95% hydrogen permeation of the membrane

79% concentration of $CO_2$ in the product gas

EXAMPLE 6

Following the procedures, and using the refurbished palladium membrane of Example 3, the unit reactor was charged with 56 gm of nickel catalyst and fed a mix of methane (3.0 sl/hr, 0.13 mole/hr) and steam (8.1 gm/hr, 0.45 mole/hr). The unit operating pressure was 380 psig. At 500° C., product effluent analyses showed:

92% methane conversion per pass

99% hydrogen permeation of the membrane

94% $CO_2$ concentration in the product effluent Analysis of the permeate gas showed:

99% purity hydrogen

We claim:

1. A process for the production of hydrogen, comprising:
   a) reacting steam with a vaporizable hydrocarbon at a temperature of from about 200° C. to about 700° C. and at a pressure of from about 1 bar to about 200 bar in a reaction zone containing a reforming catalyst to produce a mixture of primarily hydrogen and carbon dioxide, with a lesser amount of carbon monoxide;
   b) providing heat to said reaction zone by employing flameless distributed combustion comprising passing a fuel gas through a fuel tube having a plurality of openings or nozzles spaced along the length of the fuel tube thereby driving said reaction;
   c) conducting said reaction in the vicinity of a hydrogen-permeable and hydrogen-selective membrane, whereby hydrogen formed in said reaction zone permeates through said selective membrane and is separated from said carbon dioxide and carbon monoxide.

2. The process of claim 1 wherein the vaporizable hydrocarbon is selected from the group consisting of natural gas, methane, methanol, ethane, ethanol, propane, butane, light hydrocarbons having 1–4 carbon atoms in each molecule, light petroleum fractions including naphtha, diesel, kerosene, jet fuel or gas oil, and hydrogen, carbon monoxide and mixtures thereof.

3. The process of claim 1 wherein the flameless distributed combustion used to drive the reaction comprises:
   a) preheating either a fuel gas or oxidant or both to a temperature that exceeds the autoignition temperature of the fuel gas and oxidant when they are mixed;
   b) passing said fuel gas and oxidant into a heating zone which is in heat transferring contact along a substantial portion of said reaction zone; and
   c) mixing the fuel gas and oxidant in said heating zone in a manner that autoignition occurs, resulting in combustion without high temperature flames, thereby providing uniform or tailored, controlled heat over a substantial portion of said heating zone which is in contact with said reaction zone.

4. The process of claim 3 wherein the fuel gas is passed through a plurality of tubes in said heating zone, said tubes having openings sized and spaced to control the quantity of fuel gas mixed with oxidant at various points along the heating zone.

5. The process of claim 4 wherein the oxidant is air, and the air and fuel gas used for flameless distributed combustion are heated to a temperature between about 1000° F. and about 2300° F.

6. The process of claim 3 wherein the fuel gas is mixed with oxidant in increments so that upon autoignition the temperature of the resulting combustion gas will rise no more than from about 20° F. to about 200° F.

7. The process of claim 4 wherein said heating zone substantially surrounds said reaction zone.

8. The process of claim 7 wherein the plurality of tubes in the heating zone are placed in a circular pattern in said heating zone.

9. The process of claim 2 wherein a sweep gas is used to promote the permeation of hydrogen through said membrane.

10. The process of claim 9 wherein the sweep gas is selected from the group consisting of steam, carbon dioxide, nitrogen and condensable hydrocarbons.

11. The process of claim 2 wherein said hydrogen permeable membrane comprises one or more Group VIII metals on a porous ceramic or porous metal support.

12. The process of claim 2 wherein the vaporizable hydrocarbon is methane or methanol.

13. The process of claim 2 wherein the vaporizable hydrocarbon is naphtha at boiling point range of 350–500° F., or diesel, kerosene or jet fuel at boiling point range of 350–500° F., or gas oil at boiling point range of 450–800° F.

14. The process of claim 1 characterized by the use of a reduced steam to vaporizable hydrocarbon ratio without substantial coke formation in said reaction zone heated by said flameless distributed combustion.

15. The process of claim 3 wherein the fuel gas which is mixed with an oxidant and used for flameless distributed combustion is hydrogen.

16. The process of claim 1 wherein said reforming catalyst comprises at least one Group VIII transition metal on a support.

17. The process of claim 1 wherein said membrane has a permeability in the range of $8 \times 10^{-4}$ to 80 standard cubic meters/m$^2$/sec/bar$^{1/2}$.

18. The process of claim 11 wherein said hydrogen-permeable membrane comprises Pd or a Pd alloy.

19. The process of claim 1 wherein the temperature in the reaction zone is from about 3000° C. to about 600° C. and the pressure is from about 10 bar to about 50 bar.

20. The process of claim 11 wherein said membrane has a permeability in the range of $8 \times 10^{-3}$ to 70 standard cubic meters/m$^2$/sec/bar$^{1/2}$.

21. The process of claim 1 wherein a vacuum is used to promote the diffusion of hydrogen through said membrane.

22. The process of claim 9 wherein the sweep gas is steam.

23. The process of claim 16 wherein said reforming catalyst comprises nickel on alumina.

24. The process of claim 19 wherein the temperature in the reaction zone is from about 400° C. to about 500° C.

25. The process of claim 18 wherein the hydrogen-permeable membrane comprises Pd or Pd alloy on a porous stainless steel support.

26. The process of claim 15 wherein the oxidant is air and the hydrogen and air are combusted at a stoichiometric ratio of hydrogen to oxygen of 2:1, resulting in a flue gas stream that has a high concentration of nitrogen on a dry basis.

27. The process of claim 1 characterized in that nitrogen oxide formation in the reaction zone heated by said flameless distributed combustion is at a level below 10 ppm.

28. The process of claim 1 wherein the vaporizable hydrocarbon and steam provides a minimum overall O:C ratio of 2:1.

29. The process of claim 1 wherein the amount of CO in the hydrogen which permeates through the membrane is less than about 10 ppm.

30. The process of claim 29 wherein nitrogen oxide formation in the reaction zone heated by flameless distributed combustion is less than 1 ppm.

31. The process of claim 25 wherein the Pd alloy is selected from the group consisting of an alloy of Pd with 30–50% w copper, an alloy of Pd with 5–30% w silver, an alloy of Pd with 1–10% w yttrium, an alloy of Pd with 1–10% w holmium, an alloy of Pd with 10% w gold, an alloy of Pd with 1–10% w ruthenium and an alloy of Pd with 1–10% w cerium.

32. The process of claim 1 wherein the hydrogen permeable membrane has a thickness in the range of 0.1 to 20 μm.

33. The process of claim 32 wherein the hydrogen permeable membrane has a thickness of 0.5 to 3 μm.

34. A process for the production of high purity hydrogen and the use thereof in generating electricity which comprises:
a) reacting steam with a vaporizable hydrocarbon at a temperature of about 200° C. to about 700° C. and a pressure of from about 1 to about 200 bar in a reaction zone containing reforming catalyst to produce a mixture of primarily hydrogen and carbon dioxide, with a lesser amount of carbon monoxide;
b) providing heat to said reaction zone by employing flameless distributed combustion comprising passing a fuel gas through a fuel tube having a plurality of openings or nozzles spaced along the length of the fuel tube thereby driving said reaction;
c) conducting said reaction in the vicinity of a hydrogen-permeable and hydrogen selective membrane, whereby hydrogen formed in said reaction zone permeates through said selective membrane and is separated from said carbon dioxide and carbon monoxide; and
d) directing said separated hydrogen to the anode of a fuel cell.

35. The process of claim 34 wherein the fuel cell is a high pressure molten carbonate fuel cell and the non permeable by-product gases from the reaction zone are directed to the cathode of said fuel cell.

36. The process of claim 35, which further comprises the separation and sequestration of high concentrations of carbon dioxide from the process streams and/or from other external $CO_2$-containing streams.

37. The process of claim 35 wherein nitrogen is obtained as a high purity stream from the outlet of the cathode of a molten carbonate fuel cell.

38. The process of claim 35 wherein the efficiency in the generation of electricity from the vaporizable hydrocarbon starting fuel is 71% or greater.

39. The process of claim 34 wherein the fuel cell is a PEM fuel cell or a solid oxide fuel cell.

40. A steam reforming process for producing high purity hydrogen and $CO_2$ which comprises:
a) providing a generally tubular reforming chamber having one or more inlets for a vaporizable, hydrocarbon and steam and one or more corresponding outlets for byproduct gases, including $H_2O$, and $CO_2$, with a flow path in between said inlet and outlet, and
one or more inlets for sweep gas and corresponding outlets for sweep gas and hydrogen, with a flow path between said inlet and outlet, and one or more inlets for preheated oxidant and corresponding inlets for fuel gas mixtures, with a flow path between said inlets containing a plurality of flameless distributed combustion heaters,
Wherein said flow path for vaporizable hydrocarbon and flow path for sweep gas forms two concentric sections with an annulus between having a reforming catalyst therein and including a permeable membrane on the inside or outside of the concentric sections;
b) Feeding into said reforming chamber through said one or more inlets a stream of vaporizable hydrocarbon and steam;
c) Flowing said vaporizable hydrocarbon over a reforming catalyst;
d) Causing steam reforming to take place in said reforming chamber; and
e) Conducting said reforming in the vicinity of a hydrogen permeable and hydrogen-selective membrane, whereby pure hydrogen permeates said membrane;
f) Wherein heat to drive said reaction is provided by said flameless distributed combustion heaters.

41. The process of claim 40 wherein the temperature in said reforming chamber is from about 200° C. to about 700° C.

42. The process of claim 41 wherein the vaporizable hydrocarbon is selected from the group consisting of natural gas, methane, methanol, ethane, ethanol, propane, butane, light hydrocarbons having 1–4 carbon atoms in each molecule, light petroleum fractions including naphtha at boiling point range of 350–500° F., or diesel, kerosene or jet fuel at boiling point range of 350–500° F., or gas oil at boiling point range of 450–800° F., hydrogen, carbon monoxide and mixtures thereof.

43. The process of claim 42 wherein the sweep gas is selected from the group consisting of steam, carbon dioxide, nitrogen and condensable hydrocarbons.

44. The process of claim 40 wherein the flameless distributed combustion used to heat the reforming chamber comprises:
   a) preheating either a fuel gas or oxidant or both to a temperature that exceeds the autoignition temperature of the fuel gas and oxidant when they are mixed;
   b) passing said fuel gas and oxidant into said heaters which is in heat transferring contact along a substantial portion of said reforming chamber; and
   c) mixing the fuel gas and oxidant in said heaters in a manner that autoignition occurs, resulting in combustion without high temperature flames, thereby providing uniform, controllable heat over a substantial portion of said heating zone which is in contact with said reforming chamber.

45. The process of claim 40 wherein said plurality of flameless distributed combustion heaters are placed in a circular pattern in the outer concentric section.

46. The process of claim 41 wherein said inlet stream of vaporizable hydrocarbon and steam pass into said reforming chamber and into contact with said catalyst and one side of said hydrogen-selective membrane to produce $CO_2$, CO and $H_2$.

47. The process of claim 44 further comprising passing a separate stream including steam, carbon dioxide, nitrogen, or condensable hydrocarbon through an inlet adjacent to the opposite side of said membrane in such manner as to promote hydrogen diffusion through said membrane from one side to the opposite side thereof, thereby causing more complete conversion of said originally supplied hydrocarbon.

48. The process of claim 47 wherein said sweep gas is passed counter current to the path of the vaporizable hydrocarbon.

49. The process of claim 45 further comprising removing hydrogen from the opposite side of said membrane.

50. The process of claim 40 wherein said hydrogen that permeates said permeable membrane is recovered by a vacuum means, wherein when a vacuum is used to recover hydrogen, the inlet on the permeate side is not used because no sweep gas is required, and only the outlet is required.

51. The process of claim 44 wherein said vaporizable hydrocarbon is selected from the group consisting of natural gas, methane, methanol, ethane, ethanol, propane, butane, light hydrocarbon having 1–4 carbon atoms in each molecule, light petroleum fractions, including naphtha at boiling point range of 120–400° F., or diesel, kerosene or jet fuel atboiling point range of 350–500° F., or gas oil at boiling point range of 450–800° F., hydrogen, carbon monoxide and mixtures thereof.

52. The process of claim 44 wherein said vaporizable hydrocarbon consists essentially of methane.

53. The process of claim 40 wherein said stream of vaporizable hydrocarbon includes carbon and steam at a minimum overall O:C ratio of 2:1.

54. The process of claim 40 wherein said reforming chamber is at a temperature in the range of from about 300 to about 650° C.

55. The process of claim 54 wherein said reforming chamber is at a temperature in the range of from about 400 to about 550° C.

56. The process of claim 55 wherein the temperature range permits the use of less expensive materials in construction.

57. The process of claim 56 wherein said reforming chamber is constructed of less expensive materials, containing less chromium and nickel, not suitable for similar steam methane reformers in the art which must operate at higher temperatures.

58. The process of claim 55 wherein said reforming chamber is constructed of an alloy containing less than 25% Cr and less than 20% Ni, with most of the balance comprising iron.

59. The process of claim 55 wherein the reforming chamber is constructed of AISI 304 stainless steel, comprising about 18% Cr, about 8% Ni, and the balance Fe or AISI 316 L stainless steel.

60. The process of claim 40 wherein said reforming chamber is at a pressure at a minimum of one bar absolute.

61. The process of claim 41 wherein said reforming chamber is at a pressure in the range of 1 to 200 Bar.

62. The process of claim 42 wherein the reforming chamber is at a pressure in the range of 10–100 Bar.

63. The process of claim 40 wherein said reforming catalyst comprises at least one Group VIII transition metal.

64. The process of claim 63 wherein said reforming catalyst comprises nickel.

65. The process of claim 64 wherein said reforming catalyst is on a support.

66. The process of claim 65 wherein said support is selected from the group consisting of oxides, carbides, and nitrides of Group III A, IIIB, IV A, IVB, and Group VIII metals of the Periodic Table.

67. The process of claim 66 wherein said support is selected from the group consisting of porous metal oxides that are inert on their own and porous metal oxides that have the capacity to passivate the surface of a support.

68. The process of claim 67 wherein the support is a porous metal oxide.

69. The process of claim 68 wherein the support comprises alumina.

70. The process of claim 69 wherein said reforming catalyst comprises nickel on alumina.

71. The process of claim 40 wherein said hydrogen-permeable membrane comprises one or more Group VIII transition metals or alloys thereof.

72. The process of claim 40 wherein said vaporizable hydrocarbon is syngas.

73. The process of claim 72 wherein said hydrogen permeable-membrane is situated on a porous ceramic or porous metallic support.

74. The process of claim 73 wherein the support comprises a porous metal.

75. The process of claim 73 wherein the support comprises a porous ceramic.

76. The process of claim 75 wherein the support comprises alumina.

77. The process of claim 74 wherein the support comprises porous stainless steel or Inconel or Hastelloy.

78. The process of claim 77 further comprising an intermediate layer between said support and said membrane.

79. The process of claim 75 further comprising the support serves as a thermal insulating layer to assist in keeping the membrane at a desired temperature.

80. The process of claim 76 further comprising the concentration of alumina permits the tailoring of the design to emphasize insulating or conducting properties.

81. The process of claim 71 wherein said hydrogen-permeable membrane is selected from the group consisting of palladium and palladium alloys.

82. The process of claim 81 wherein said hydrogen-permeable membrane comprises at least one of an alloy of Pd with 30–50 wt % copper, an alloy of Pd with 5–30 wt % silver, an alloy of Pd with 1–10 wt % yttrium, an alloy of Pd with 1–10 wt % holmium, an alloy of Pd with 1–10 wt % gold, an alloy of Pd with 1–10 wt % ruthenium, and an alloy of Pd with 1–10 wt % cerium.

83. The process of claim 71 wherein said hydrogen-permeable membrane is selected from the group consisting of platinum and platinum alloys.

84. The process of claim 72 wherein said membrane has a thickness in the range of 10 Angstroms to 150 µm.

85. The process of claim 72 wherein said membrane has a thickness in the range of 0.1 to 20 µm.

86. The process of claim 81 wherein said membrane has a thickness in the range of 0.5 to 3 µm.

87. The process of claim 40 wherein said membrane has a permeability in the range of $8\times10^{-4}$ to 80 standard cubic meters/m²/sec/bar$^{1/2}$.

88. The process of claim 87 wherein said membrane has a permeability in the range of $8\times10^{-3}$ to 70 standard cubic meters/m²/sec/bar$^{1/2}$.

89. The process of claim 40 wherein the use of said membrane permits fewer unit operations in the process.

90. The process of claim 40 characterized in that nitrogen oxide formation is reduced to a level below 10 ppm.

91. The process of claim 90 wherein nitrogen oxide formation is reduced to a level below 1.0 ppm.

92. The process of claim 91 wherein nitrogen oxide formation is reduced to a level below 0.1 ppm.

93. The process of claim 40 wherein said flameless distributed combustion comprises:
   a) passing an oxidant through said inlet to a mixing point;
   b) passing fuel gas through said corresponding inlet to a mixing point within the pathway between the two inlets juxtapose to the point to be heated;
   c) preheating either the fuel gas or oxidant or both such that the temperature of the mixed stream exceeds an autoignition temperature of the mixture of the streams; and
   d) combining the preheated oxidant and fuel gas at the mixing point resulting in autoignition forming combustion products.

94. The process of claim 93 wherein said flameless distributed combustors further comprise:
   a) an axial combustion chamber in communication with an inlet for oxidant at one end and in communication with a combustion product outlet at the other end;
   b) a fuel conduit within the axial combustion chamber, the fuel conduit defining a fuel volume, the fuel volume in communication with the fuel supply, and in communication with the combustion chamber through a plurality of orifices along the fuel conduit wherein the fuel conduit comprises an electrically conductive material; and
   c) any method of preheating air effective to heat the fuel conduit in the vicinity of at least one orifice to temperature above a temperature at which the fuel will ignite when the fuel passes through the orifices.

95. The process of claim 40 further comprising said section containing said membrane is packed with a methanation catalyst to react with any trace amounts of CO that escape through said membrane.

96. The process of claim 95 wherein said methanation catalyst is nickel or iron or copper based.

97. The process of claim 40 further comprising said steam reformer can function alone as a hydrogen generator to supply a source of hydrogen for any process requiring a source of hydrogen.

98. The process of claim 97 wherein said steam reformer can function alone as a hydrogen generator to supply a source of hydrogen for any process selected from the group consisting of production of ammonia, production of electricity, refining, semiconductor processing, hydrogen peroxide manufacture, hydrogenation of chemical intermediates and production of hydrogen for chemical analytical testing.

99. A process for the production of pure hydrogen and the use thereof in a zero emission hybrid power system which comprises:
   a) Providing a generally tubular reforming chamber having one or more inlets for a vaporizable hydrocarbon and steam and one or more corresponding outlets for byproduct gases, including $H_2O$ and $CO_2$, with a flow path in between said inlet and outlet, and one or more inlets for and corresponding outlets for sweep gas and hydrogen, with a flow path between said inlet and outlet, and an inlet for preheated air and a corresponding inlet for fuel gas mixtures, with a flow path between said inlets containing a plurality of flameless distributed combustion heaters, wherein said flow path for vaporizable hydrocarbon and flow path for sweep gas form two concentric sections with an annulus between having a reforming catalyst therein and a hydrogen permeable membrane on the inside or outside of one of the concentric sections;
   b) Feeding into said reforming chamber through said inlets a vaporizable hydrocarbon and steam;
   c) Flowing said vaporizable hydrocarbon over said reforming catalyst;
   d) Causing steam reforming to take place in said reforming chamber;
   e) Conducting said reforming in the vicinity of a hydrogen permeable and hydrogen-selective membrane, whereby pure hydrogen permeates said membrane;
   f) directing said pure hydrogen to the anode of a fuel cell and directing by-product gases to the cathode of said fuel cell;
   g) Wherein heat to drive the reaction in said reforming chamber is provided by said flameless distributed combustion.

100. The process of claim 99 wherein steam, carbon dioxide, nitrogen, or a condensable hydrocarbon is used as a carrier of hydrogen.

101. The process of claim 100 wherein the fuel cell is a high-pressure fuel cell.

102. The process of claim 101 wherein the fuel cell is a high-pressure molten carbonate fuel cell.

103. The process of claim 102, which further comprises the separation and sequestration of high concentrations of carbon dioxide from the process streams and/or from other external $CO_2$-containing streams.

104. The process of claim 103 wherein said carbon dioxide is used to make chemicals.

105. The process of claim 99 wherein the carbon dioxide stream, the hydrogen stream or the nitrogen stream from the process is used to make urea, ammonia or ammonium sulfate.

106. The process of claim 40 wherein said carbon dioxide is used in oil recovery.

107. The process of claim 103 wherein said carbon dioxide is used in oil recovery.

108. The process of claim 40 wherein the carbon dioxide is used in coal beds.

109. The process of claim 103 wherein said carbon dioxide is used in coal beds.

110. The process of claim 40 wherein the carbon dioxide is used in secondary or tertiary oil recovery.

111. The process of claim 103 wherein the carbon dioxide is used in secondary or tertiary oil recovery.

112. The process of claim 99 which produces essentially negligible amounts of $NO_x$.

113. The process of claim 112 wherein the $NO_x$ formation is reduced to a level below 10 ppm.

114. The process of claim 113 wherein the $NO_x$ formation is reduced to a level below 1.0 ppm.

115. The process of claim 114 wherein the $NO_x$ formation is reduced to a level below 0.1 ppm.

116. The process of claim 102 wherein the presence of negligible amounts of $NO_x$ greatly enhances performance and efficiency of said method.

117. The process of claim 99 further characterized by a material and energy efficiency advantage comprising a tight material and energy integration between the Membrane Steam Reforming reactor (MSR) and the Molten Carbonate Fuel Cell (MCFC) characterized by:
   a) Feeding carbon dioxide made in the FDC heater and the membrane steam reformer to the molten carbonate fuel cell;
   b) Recycling the water used as membrane steam reformer sweep gas plus water made in the molten carbonate fuel cell, back to the membrane steam reformer feed, thus, reducing water emissions to a minimum purge stream, and obviating the need of a fresh water supply;
   c) Using the pressure and temperature of specific outlet streams to generate electricity in turbines, instead of resulting in waste heat; and
   d) Using the enthalpy of specific outlet streams to exchange heat with given inlet streams for reduction in net fuel usage.

118. The process of claim 40 further characterized by advantages in terms of distributed production of hydrogen on demand without storage requirements.

119. The process of claim 99 further comprising the option of using a vaporizable hydrocarbon produced in a remote location to produce electricity for transportation to nearby residential or commercial markets instead of transporting by pipeline.

120. The process of claim 119 wherein the vaporizable hydrocarbon is natural gas.

121. The process of claim 40 wherein the high purity hydrogen stream produced is used in a PEM fuel cell to generate electricity.

122. The process of claim 40 wherein the fuel fed to the FDC heaters is hydrogen.

123. The process of claim 122 wherein the fuel fed to the FDC heaters is hydrogen and it is combusted with air, at the stoichiometric ratio to oxygen of 2:1, resulting in a flue gas steam that is pure in nitrogen on dry basis.

124. The process of claim 99 wherein nitrogen is obtained as a high purity stream from the outlet of the cathode of the molten carbonate fuel cell.

125. The process of claim 124 wherein nitrogen is used for any process requiring a source of nitrogen.

126. The process of claim 124 wherein nitrogen is used for any process selected from the group consisting of production of ammonia, nitric acid, urea and ammonium sulfate.

127. The process of claim 40 wherein carbon dioxide is used for any process selected from the group consisting of production of urea, building materials, food products and carbonated drinks.

128. The process of claim 41 wherein the FDC section does not have a fuel inlet, but rather uses the permeated hydrogen is used as a fuel in the FDC heating section with air or oxygen as the oxidant.

129. The process of claim 1 wherein between 90 and 95% of the heat generated by flameless distributed combustion is transferred to the reacting fluids in said reaction zone.

130. The process of claim 1 wherein the vaporizable hydrocarbon comprises partly or entirely of a syngas stream from a Catalytic Partial Oxidation process.

* * * * *